(12) United States Patent
Bierdel et al.

(10) Patent No.: US 9,808,978 B2
(45) Date of Patent: Nov. 7, 2017

(54) SCREW ELEMENTS WITH REDUCED ENERGY INPUT DURING THE BUILD-UP OF PRESSURE

(75) Inventors: Michael Bierdel, Leverkusen (DE); Thomas König, Leverkusen (DE); Ulrich Liesenfelder, Bergisch Gladbach (DE)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 1392 days.

(21) Appl. No.: 12/999,409

(22) PCT Filed: Jun. 9, 2009

(86) PCT No.: PCT/EP2009/004122
§ 371 (c)(1),
(2), (4) Date: Apr. 8, 2011

(87) PCT Pub. No.: WO2009/152974
PCT Pub. Date: Dec. 23, 2009

(65) Prior Publication Data
US 2011/0180949 A1 Jul. 28, 2011

(30) Foreign Application Priority Data
Jun. 20, 2008 (DE) .................. 10 2008 029 306

(51) Int. Cl.
*B29C 47/08* (2006.01)
*B29B 7/48* (2006.01)
(Continued)

(52) U.S. Cl.
CPC .......... *B29C 47/0861* (2013.01); *B29B 7/481* (2013.01); *B29C 47/0881* (2013.01);
(Continued)

(58) Field of Classification Search
CPC ............ B29C 47/6043; B29C 47/6062; B29C 47/6056; B29C 47/0861; B29C 47/38;
(Continued)

(56) References Cited

U.S. PATENT DOCUMENTS 2,670,188 A * 2/1954 Erdmenger ............... 366/97
3,122,356 A * 2/1964 Erdmenger ............... 366/85
(Continued)

FOREIGN PATENT DOCUMENTS

DE        813154      9/1951
DE        862668      1/1953
(Continued)

OTHER PUBLICATIONS

Kohlgruber, Klemens, et al.; "Co-Rotating Twin Screw Extruders: Fundamentals, Technology, and Applications"; 2007; Chapter 2, pp. 28-29 and Chapter 5, pp. 94-104; Hanser Gardner Publications; Munich, Germany.
(Continued)

*Primary Examiner* — Charles Cooley
*Assistant Examiner* — Marc C Howell
(74) *Attorney, Agent, or Firm* — K&L Gates LLP

(57) ABSTRACT

The present invention relates to screw elements with novel, tightly intermeshing, self-cleaning, co-rotating screw profiles for multishaft screw machines with pairs of co-rotating and fully abrading screw shafts, to the use of these screw elements in multishaft screw machines and to a method of generating these screw elements.

21 Claims, 21 Drawing Sheets

Figures 1A, 1B, 1C:
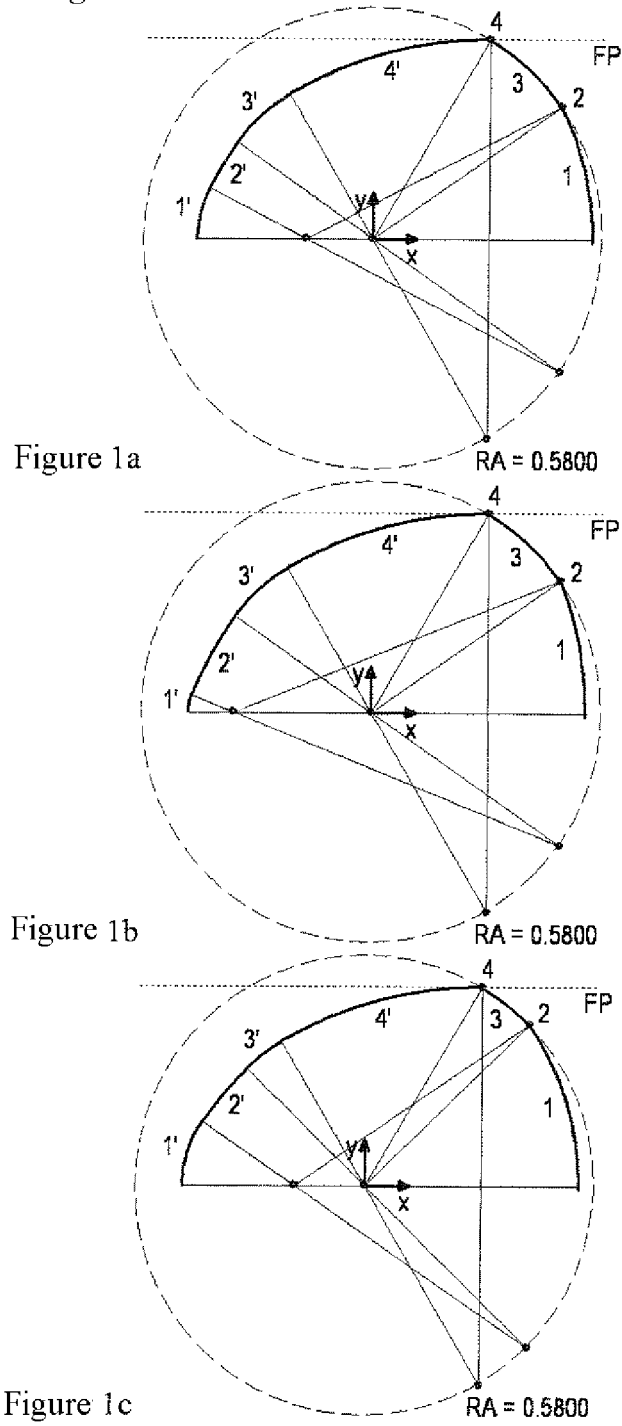

(51) Int. Cl.
  *B29C 47/38*  (2006.01)
  *B29C 47/40*  (2006.01)
  *B29C 47/64*  (2006.01)
  *B29C 47/62*  (2006.01)
  *B29C 47/60*  (2006.01)
  *B29C 47/00*  (2006.01)

(52) U.S. Cl.
  CPC ............ *B29C 47/38* (2013.01); *B29C 47/402* (2013.01); *B29C 47/6056* (2013.01); *B29C 47/6075* (2013.01); *B29C 47/625* (2013.01); *B29C 47/627* (2013.01); *B29C 47/64* (2013.01); *B29C 47/0009* (2013.01); *Y02P 70/263* (2015.11)

(58) Field of Classification Search
  CPC ... B29C 47/402; B29C 47/64; B29C 47/0881; B29C 47/627; B29B 7/481
  USPC ............. 366/82, 85, 301; 425/204, 208, 209
  See application file for complete search history.

(56) References Cited

U.S. PATENT DOCUMENTS

| | | | | |
|---|---|---|---|---|
| 3,146,493 A | * | 9/1964 | Steinle et al. | ............ 425/6 |
| 3,254,367 A | | 6/1966 | Erdmenger | |
| 3,608,868 A | * | 9/1971 | Koch | ............ B29B 7/483 366/82 |
| 4,131,371 A | | 12/1978 | Tynan | |
| 4,824,256 A | | 4/1989 | Haring et al. | |
| 6,048,088 A | * | 4/2000 | Haring | ............ B29C 47/0825 366/85 |
| 6,974,243 B2 | | 12/2005 | Uphus et al. | |
| 2001/0019729 A1 | * | 9/2001 | Inoue | ............ B29B 7/482 425/204 |
| 2007/0147169 A1 | * | 6/2007 | Mattingly, Jr. | ............ 366/82 |

FOREIGN PATENT DOCUMENTS

| | | | |
|---|---|---|---|
| DE | 3412258 A1 | | 10/1985 |
| DE | 4239220 A1 | | 5/1994 |
| EP | 002131 A1 | | 5/1979 |
| EP | 0160124 A2 | | 11/1985 |
| EP | 1316399 | * | 10/2007 |
| WO | 0209919 A2 | | 2/2002 |
| WO | 02076707 A1 | | 10/2002 |

OTHER PUBLICATIONS

International Search Report dated Jan. 10, 2011.
Klemens Kohlgrüber; Co-Rotating Twin-Screw Extruders Fundamentals, Technology, and Applications; Carl Hanser Publishers; pp. 103-235; 2007.
Klemens Kohlgruber, et al., Co-Rotating Twin-Screw Extruders: Fundamentals, Technology, and Applications, Hanser Gardner Publications, Chapter 5.2, pp. 92-94 (2007).
Klemens Kohlgruber, et al., Co-Rotating Twin-Screw Extruders: Fundamentals, Technology, and Applications, Hanser Gardner Publications, Chapter 5.8, pp. 103-104 (2007).
Klemens Kohlgruber, et al., Co-Rotating Twin-Screw Extruders: Fundamentals, Technology, and Applications, Hanser Gardner Publications, Chapter 12, pp. 215-235 (2007).

* cited by examiner

Figures

1) R = 0.7245  Mx = -0.1685
   α = 0.4771  My = 0.0000
2) R = 0.0000  Mx = 0.4751
   α = 0.1338  My = 0.3327
3) R = 0.5800  Mx = 0.0000
   α = 0.4285  My = 0.0000
4) R = 0.0000  Mx = 0.2939
   α = 0.5315  My = 0.5000
4') R = 1.0000  Mx = 0.2939
   α = 0.5315  My = -0.5000
3') R = 0.4200  Mx = 0.0000
   α = 0.4285  My = 0.0000
2') R = 1.0000  Mx = 0.4751
   α = 0.1338  My = -0.3327
1') R = 0.2755  Mx = -0.1685
   α = 0.4771  My = 0.0000

1) R = 0.8852  Mx = -0.3452
   α = 0.3853  My = 0.0000
2) R = 0.0000  Mx = 0.4751
   α = 0.2256  My = 0.3327
3) R = 0.5800  Mx = 0.0000
   α = 0.4285  My = 0.0000
4) R = 0.0000  Mx = 0.2939
   α = 0.5315  My = 0.5000
4') R = 1.0000  Mx = 0.2939
   α = 0.5315  My = -0.5000
3') R = 0.4200  Mx = 0.0000
   α = 0.4285  My = 0.0000
2') R = 1.0000  Mx = 0.4751
   α = 0.2256  My = -0.3327
1') R = 0.1148  Mx = -0.3452
   α = 0.3853  My = 0.0000

1) R = 0.7173  Mx = -0.1773
   α = 0.6025  My = 0.0000
2) R = 0.0000  Mx = 0.4137
   α = 0.1742  My = 0.4065
3) R = 0.5800  Mx = 0.0000
   α = 0.2627  My = 0.0000
4) R = 0.0000  Mx = 0.2939
   α = 0.5315  My = 0.5000
4') R = 1.0000  Mx = 0.2939
   α = 0.5315  My = -0.5000
3') R = 0.4200  Mx = 0.0000
   α = 0.2627  My = 0.0000
2') R = 1.0000  Mx = 0.4137
   α = 0.1742  My = -0.4065
1') R = 0.2827  Mx = -0.1773
   α = 0.6025  My = 0.0000

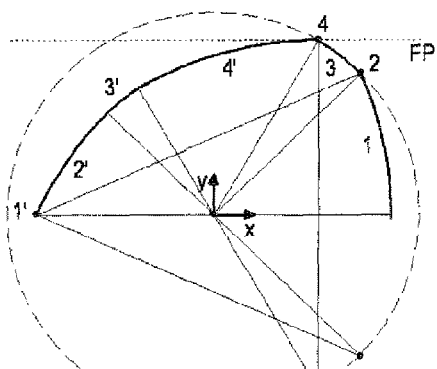

Figure 1d  RA = 0.5800

1) R = 0.9999  Mx = -0.4998
   α = 0.4187  My = 0.0000
2) R = 0.0000  Mx = 0.4137
   α = 0.3580  My = 0.4065
3) R = 0.5800  Mx = 0.0000
   α = 0.2627  My = 0.0000
4) R = 0.0000  Mx = 0.2939
   α = 0.5315  My = 0.5000
4') R = 1.0000  Mx = 0.2939
   α = 0.5315  My = -0.5000
3') R = 0.4200  Mx = 0.0000
   α = 0.2627  My = 0.0000
2') R = 1.0000  Mx = 0.4137
   α = 0.3580  My = -0.4065
1') R = 0.0001  Mx = -0.4998
   α = 0.4187  My = 0.0000

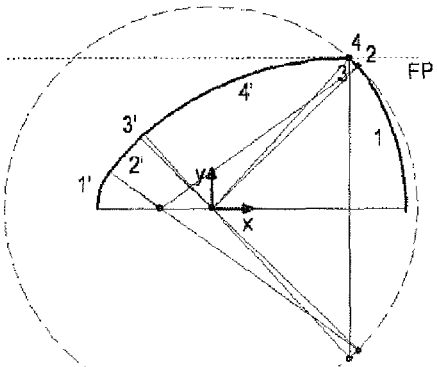

Figure 2a  RA = 0.6700

1) R = 0.7964  Mx = -0.1664
   α = 0.6371  My = 0.0000
2) R = 0.0000  Mx = 0.4738
   α = 0.1483  My = 0.4738
3) R = 0.6700  Mx = 0.0000
   α = 0.0570  My = 0.0000
4) R = 0.0000  Mx = 0.4460
   α = 0.7284  My = 0.5000
4') R = 1.0000  Mx = 0.4460
   α = 0.7284  My = -0.5000
3') R = 0.3300  Mx = 0.0000
   α = 0.0570  My = 0.0000
2') R = 1.0000  Mx = 0.4738
   α = 0.1483  My = -0.4738
1') R = 0.2036  Mx = -0.1664
   α = 0.6371  My = 0.0000

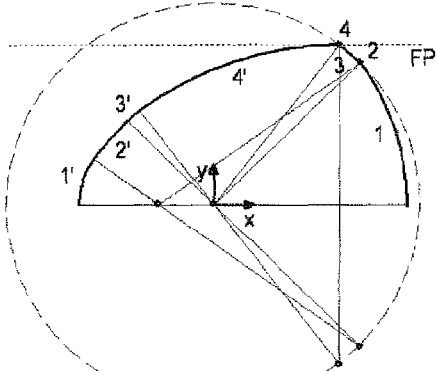

Figure 2b  RA = 0.6300

1) R = 0.7588  Mx = -0.1688
   α = 0.6274  My = 0.0000
2) R = 0.0000  Mx = 0.4455
   α = 0.1580  My = 0.4455
3) R = 0.6300  Mx = 0.0000
   α = 0.1314  My = 0.0000
4) R = 0.0000  Mx = 0.3833
   α = 0.6540  My = 0.5000
4') R = 1.0000  Mx = 0.3833
   α = 0.6540  My = -0.5000
3') R = 0.3700  Mx = 0.0000
   α = 0.1314  My = 0.0000
2') R = 1.0000  Mx = 0.4455
   α = 0.1580  My = -0.4455
1') R = 0.2412  Mx = -0.1688
   α = 0.6274  My = 0.0000

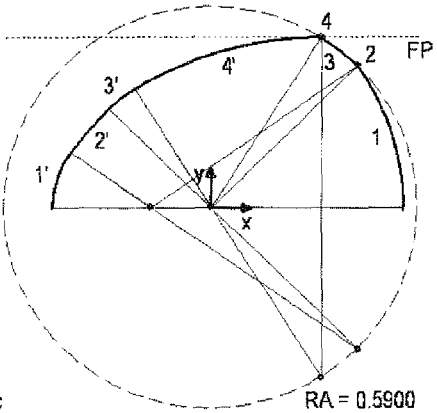

Figure 2c  RA = 0.5900

1) R = 0.7217  Mx = -0.1717
   α = 0.6164  My = 0.0000
2) R = 0.0000  Mx = 0.4172
   α = 0.1690  My = 0.4172
3) R = 0.5900  Mx = 0.0000
   α = 0.2258  My = 0.0000
4) R = 0.0000  Mx = 0.3132
   α = 0.5596  My = 0.5000
4') R = 1.0000  Mx = 0.3132
   α = 0.5596  My = -0.5000
3') R = 0.4100  Mx = 0.0000
   α = 0.2258  My = 0.0000
2') R = 1.0000  Mx = 0.4172
   α = 0.1690  My = -0.4172
1') R = 0.2783  Mx = -0.1717
   α = 0.6164  My = 0.0000

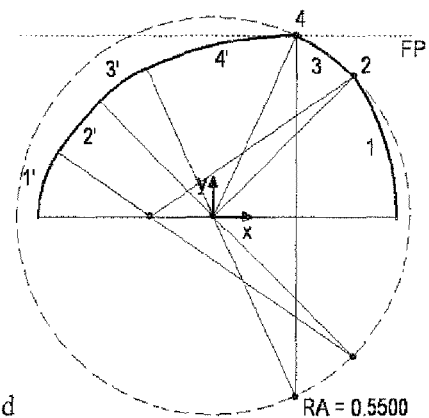

Figure 2d

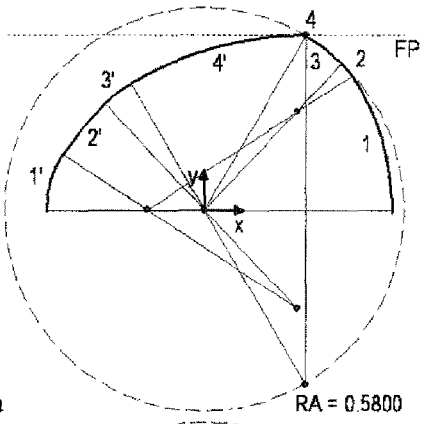

Figure 3a

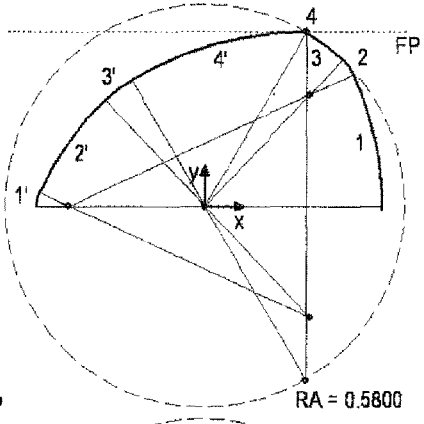

Figure 3b

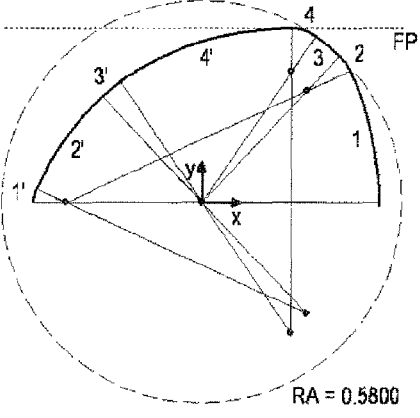

Figure 4a

1) R = 0.6851  Mx = -0.1751
   α = 0.6037  My = 0.0000
2) R = 0.0000  Mx = 0.3889
   α = 0.1817  My = 0.3889
3) R = 0.5500  Mx = 0.0000
   α = 0.3557  My = 0.0000
4) R = 0.0000  Mx = 0.2291
   α = 0.4297  My = 0.5000
4') R = 1.0000  Mx = 0.2291
   α = 0.4297  My = -0.5000
3') R = 0.4500  Mx = 0.0000
   α = 0.3557  My = 0.0000
2') R = 1.0000  Mx = 0.3889
   α = 0.1817  My = -0.3889
1') R = 0.3149  Mx = -0.1751
   α = 0.6037  My = 0.0000

1) R = 0.7081  Mx = -0.1655
   α = 0.5766  My = 0.0000
2) R = 0.1924  Mx = 0.2668
   α = 0.2350  My = 0.2812
3) R = 0.5800  Mx = 0.0000
   α = 0.2278  My = -0.0000
4) R = 0.0000  Mx = 0.2940
   α = 0.5315  My = 0.5000
4') R = 1.0000  Mx = 0.2940
   α = 0.5315  My = -0.5000
3') R = 0.4200  Mx = 0.0000
   α = 0.2278  My = 0.0000
2') R = 0.8076  Mx = 0.2668
   α = 0.2350  My = -0.2812
1') R = 0.2919  Mx = -0.1655
   α = 0.5766  My = 0.0000

1) R = 0.9061  Mx = -0.3937
   α = 0.4304  My = 0.0000
2) R = 0.1385  Mx = 0.3039
   α = 0.3812  My = 0.3202
3) R = 0.5800  Mx = -0.0000
   α = 0.2278  My = -0.0000
4) R = 0.0000  Mx = 0.2939
   α = 0.5315  My = 0.5000
4') R = 1.0000  Mx = 0.2939
   α = 0.5315  My = -0.5000
3') R = 0.4200  Mx = -0.0000
   α = 0.2278  My = 0.0000
2') R = 0.8615  Mx = 0.3039
   α = 0.3812  My = -0.3202
1') R = 0.0939  Mx = -0.3937
   α = 0.4304  My = 0.0000

1) R = 0.9061  Mx = -0.3937
   α = 0.4304  My = 0.0000
2) R = 0.1385  Mx = 0.3039
   α = 0.3812  My = 0.3202
3) R = 0.5800  Mx = -0.0000
   α = 0.1580  My = -0.0000
4) R = 0.1239  Mx = 0.2580
   α = 0.6013  My = 0.3761
4') R = 0.8761  Mx = 0.2580
   α = 0.6013  My = -0.3761
3') R = 0.4200  Mx = -0.0000
   α = 0.1580  My = 0.0000
2') R = 0.8615  Mx = 0.3039
   α = 0.3812  My = -0.3202
1') R = 0.0939  Mx = -0.3937
   α = 0.4304  My = 0.0000

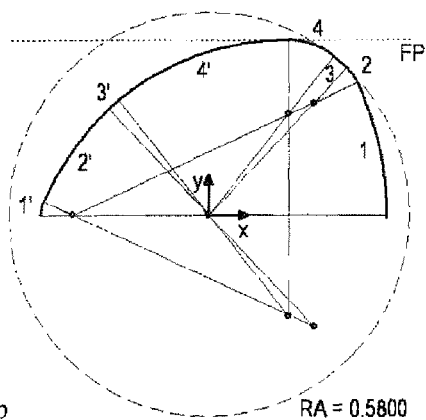

1) R = 0.9061  Mx = -0.3937
   α = 0.4304  My = 0.0000
2) R = 0.1385  Mx = 0.3039
   α = 0.3812  My = 0.3202
3) R = 0.5800  Mx = -0.0000
   α = 0.0881  My = -0.0000
4) R = 0.2111  Mx = 0.2294
   α = 0.6711  My = 0.2889
4') R = 0.7889  Mx = 0.2294
   α = 0.6711  My = -0.2889
3') R = 0.4200  Mx = -0.0000
   α = 0.0881  My = 0.0000
2') R = 0.8615  Mx = 0.3039
   α = 0.3812  My = -0.3202
1') R = 0.0939  Mx = -0.3937
   α = 0.4304  My = 0.0000

Figure 4b                    RA = 0.5800

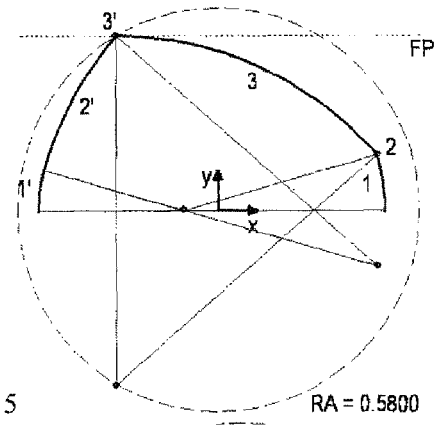

1) R = 0.5800  Mx = -0.1001
   α = 0.2793  My = 0.0000
2) R = 0.0000  Mx = 0.4574
   α = 0.4414  My = 0.1599
3) R = 1.0000  Mx = -0.2940
   α = 0.8501  My = -0.5000
3') R = 0.0000  Mx = -0.2940
   α = 0.8501  My = 0.5000
2') R = 1.0000  Mx = 0.4574
   α = 0.4414  My = -0.1599
1') R = 0.4200  Mx = -0.1001
   α = 0.2793  My = 0.0000

Figure 5                     RA = 0.5800

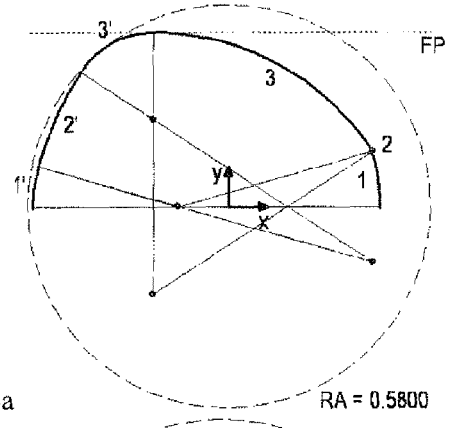

1) R = 0.5800  Mx = -0.1448
   α = 0.2793  My = 0.0000
2) R = 0.0000  Mx = 0.4127
   α = 0.2989  My = 0.1599
3) R = 0.7500  Mx = -0.2154
   α = 0.9926  My = -0.2500
3') R = 0.2500  Mx = -0.2154
   α = 0.9926  My = 0.2500
2') R = 1.0000  Mx = 0.4127
   α = 0.2989  My = -0.1599
1') R = 0.4200  Mx = -0.1448
   α = 0.2793  My = 0.0000

Figure 6a                    RA = 0.5800

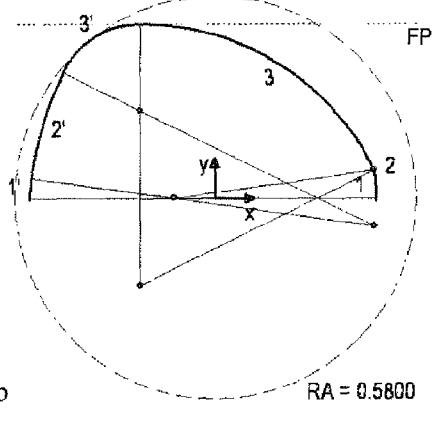

1) R = 0.5800  Mx = -0.1166
   α = 0.1396  My = 0.0000
2) R = 0.0000  Mx = 0.4577
   α = 0.3171  My = 0.0807
3) R = 0.7500  Mx = -0.2154
   α = 1.1141  My = -0.2500
3') R = 0.2500  Mx = -0.2154
   α = 1.1141  My = 0.2500
2') R = 1.0000  Mx = 0.4577
   α = 0.3171  My = -0.0807
1') R = 0.4200  Mx = -0.1166
   α = 0.1396  My = 0.0000

Figure 6b                    RA = 0.5800

1) R = 0.5800  Mx = -0.1194
   α = 0.2793  My = 0.0000
2) R = 0.1250  Mx = 0.3180
   α = 0.5170  My = 0.1254
3) R = 1.0000  Mx = -0.2940
   α = 0.7745  My = -0.5000
3') R = 0.0000  Mx = -0.2940
   α = 0.7745  My = 0.5000
2') R = 0.8750  Mx = 0.3180
   α = 0.5170  My = -0.1254
1') R = 0.4200  Mx = -0.1194
   α = 0.2793  My = 0.0000

RA = 0.5800

1) R = 0.5800  Mx = -0.1531
   α = 0.2793  My = 0.0000
2) R = 0.1250  Mx = 0.2843
   α = 0.3651  My = 0.1254
3) R = 0.7500  Mx = -0.2154
   α = 0.9265  My = -0.2500
3') R = 0.2500  Mx = -0.2154
   α = 0.9265  My = 0.2500
2') R = 0.8750  Mx = 0.2843
   α = 0.3651  My = -0.1254
1') R = 0.4200  Mx = -0.1531
   α = 0.2793  My = 0.0000

RA = 0.5800

1) R = 0.5800  Mx = -0.1252
   α = 0.1396  My = 0.0000
2) R = 0.1250  Mx = 0.3254
   α = 0.3855  My = 0.0633
3) R = 0.7500  Mx = -0.2154
   α = 1.0457  My = -0.2500
3') R = 0.2500  Mx = -0.2154
   α = 1.0457  My = 0.2500
2') R = 0.8750  Mx = 0.3254
   α = 0.3855  My = -0.0633
1') R = 0.4200  Mx = -0.1252
   α = 0.1396  My = 0.0000

RA = 0.5800

1) R = 0.0000  Mx = 0.4827
   α = 0.5236  My = 0.0000
2) R = 1.0000  Mx = -0.3833
   α = 1.0472  My = -0.5000
2') R = 0.0000  Mx = -0.3833
   α = 1.0472  My = 0.5000
1') R = 1.0000  Mx = 0.4827
   α = 0.5236  My = 0.0000

RA = 0.6300

1) R = 0.1000  Mx = 0.3451
   α = 0.5236  My = 0.0000
2) R = 0.9000  Mx = -0.3477
   α = 1.0472  My = -0.4000
2') R = 0.1000  Mx = -0.3477
   α = 1.0472  My = 0.4000
1') R = 0.9000  Mx = 0.3451
   α = 0.5236  My = 0.0000

RA = 0.6300

1) R = 0.2000  Mx = 0.2116
   α = 0.5236  My = 0.0000
2) R = 0.8000  Mx = -0.3081
   α = 1.0472  My = -0.3000
2') R = 0.2000  Mx = -0.3081
   α = 1.0472  My = 0.3000
1') R = 0.8000  Mx = 0.2116
   α = 0.5236  My = 0.0000

RA = 0.6300

1) R = 0.8681  Mx = -0.3281
   α = 0.4603  My = 0.0000
2) R = 0.0000  Mx = 0.4496
   α = 0.2378  My = 0.3857
3) R = 0.6000  Mx = -0.0100
   α = 0.2870  My = 0.0000
4) R = 0.0000  Mx = 0.3216
   α = 0.5856  My = 0.5000
4') R = 1.0000  Mx = 0.3216
   α = 0.5856  My = -0.5000
3') R = 0.4000  Mx = -0.0100
   α = 0.2870  My = 0.0000
2') R = 1.0000  Mx = 0.4496
   α = 0.2378  My = -0.3857
1') R = 0.1319  Mx = -0.3281
   α = 0.4603  My = 0.0000

RA = 0.6000

1) R = 0.8681  Mx = -0.3481
   α = 0.4603  My = 0.0000
2) R = 0.0000  Mx = 0.4296
   α = 0.2378  My = 0.3857
3) R = 0.6000  Mx = -0.0300
   α = 0.2870  My = 0.0000
4) R = 0.0000  Mx = 0.3016
   α = 0.5856  My = 0.5000
4') R = 1.0000  Mx = 0.3016
   α = 0.5856  My = -0.5000
3') R = 0.4000  Mx = -0.0300
   α = 0.2870  My = 0.0000
2') R = 1.0000  Mx = 0.4296
   α = 0.2378  My = -0.3857
1') R = 0.1319  Mx = -0.3481
   α = 0.4603  My = 0.0000

RA = 0.6000

SCREW ELEMENTS WITH REDUCED ENERGY INPUT DURING THE BUILD-UP OF PRESSURE

The present invention relates to screw elements with novel, tightly intermeshing, self-cleaning, co-rotating screw profiles for multishaft screw-type machines with pairs of co-rotating and fully abrading screw shafts, to the use of these screw elements in multishaft screw-type machines and to a method of generating these screw elements.

Co-rotating twin- or optionally multishaft machines whose rotors fully abrade each other have been known for a long time (see, for example, German Patent No. 862,668). Screw-type machines based on the principle of fully abrading profiles have been used for many diverse applications in the field of polymer production and processing. This is mainly due to the fact that polymer melts adhere to surfaces and are degraded over time at the processing temperatures commonly employed. This is prevented by the self-cleaning effect of fully abrading screws. Rules for generating fully abrading screw profiles are described for example in publication [1] on pages 96-109 ([1]=*Klemens Kohlgrüber: Der gleichläufige Doppelschneckenextruder* ("*The co-rotating twin-screw extruder*"), Publishers: Hanser Verlag, Munich, 2007), in which it is also stated that a predefined screw profile on the 1st shaft of a twin-screw extruder determines the screw profile on the 2nd shaft of a twin-screw extruder. The screw profile on the first shaft of the twin-screw extruder is therefore referred to as the generating screw profile. The screw profile on the 2nd shaft of the twin-screw extruder is based on the screw profile on the 1st shaft of the twin-screw extruder and is therefore referred to as the generated screw profile. In multishaft extruders the generating screw profile and the generated screw profile are always arranged alternately on adjacent shafts.

Modern twin-screw extruders consist of a modular system in which various screw elements can be mounted onto a central shaft. This allows those skilled in the art to adjust twin-screw extruders to suit the processing task concerned.

As is known to those skilled in the art and as is explained, for example, on pages 96 to 109 of [1], the known tightly intermeshing, self-cleaning, co-rotating Erdmenger screw profile is clearly defined by the following three parameters: the number of flights z, the outer screw radius ra and the centre distance a. The number of flights z is an integer greater than or equal to 1. An additional important parameter of screw profiles is their inner radius ri. Another important parameter of screw profiles is their flight depth h.

Those regions of a screw profile having the same radius as the outer screw radius are referred to as tip regions. Those regions of a screw profile having the same radius as the inner radius are referred to as groove regions. Those regions of a screw profile which have a radius smaller than the outer screw radius but larger than the inner radius are referred to as flank regions. That region of a multi-screw extruder in which two barrel bores penetrate each other is referred to as the intermeshing zone. The two intersecting points between two barrel bores are referred to as the barrel intersection points.

The tip angle $\delta\_kw$ of a z-flight Erdmenger screw profile is calculated as follows: $\delta\_kw = \pi/z - 2*\arccos(0.5*a/ra)$, wherein $\pi$ is pi ($\pi \approx 3.14159$) [1]. According to this formula for calculating the tip angle, the tip angles of a 1-flight and a 2-flight Erdmenger screw profile differ by $\pi/2$ given an identical centre distance and an identical outer screw radius. If the barrel radius rg is the same as the outer radius ra, the opening angle $\delta\_gz$ between the two barrel intersection points can be calculated to be $\delta\_gz = 2*\arccos(0.5*a/ra)$. In one-flight Erdmenger screw profiles this means that where the ratio between the outer screw radius and the centre distance is smaller than about 0.707, the intermeshing zone is completely sealed by the tip region of the screw profile.

The barrel regions surrounding the two barrel intersection points are referred to as the barrel intermeshing zone. In the context of the following description this region comprises in each barrel bore, based on each of the two barrel intersection points, an angle of $\delta\_gb$ in relation to the centre point of the barrel bores, which is calculated from the difference of the tip angle of a one-flight Erdmenger screw profile minus the opening angle between the two barrel intersection points: $\delta\_gb = \pi - 4*\arccos(0.5*a/ra)$.

[1] also explains in detail the design, function and operation of twin- and multishaft extruders. An entire chapter (pages 227-248) is devoted to the subject of screw elements and their mode of action. A detailed explanation is provided of the design and the function of conveying, kneading and mixing elements. In order to provide a transition between screw elements with different numbers of flights, washers are frequently used as spacers. In special cases, so-called transition elements are used which provide a continuous transition between two screw profiles with different numbers of flights, a self-cleaning pair of screw profiles being present at each point of the transition.

Patent DP 813154 depicts a one-flight, tightly intermeshing, self-cleaning, co-rotating screw profile. Such screw profiles have the advantage that the tip region seals off the intermeshing zone, as a result of which conveying elements based on this screw profile have a high pressure build-up capacity. Such screw profiles have the disadvantage that the tip region is very large, thereby resulting in undesirable thermal and mechanical stresses on the viscous fluids to be processed.

In patents U.S. Pat. No. 4,131,371 A and DE 3412258 A1 eccentric, three-flight, tightly intermeshing, self-cleaning, co-rotating screw profiles are depicted. Their eccentricity is always such that only one tip wipes the barrel. Such screw profiles have the disadvantage that the intermeshing zone is not sealed, as a result of which the pressure build-up capacity of a conveying element based on such screw profiles is low.

Patent DE 4239220 A1 describes a three-flight self-cleaning screw profile in which the tip angle of the 3 tips differs in size. Only the tip with the largest tip angle touches the barrel. Such screw profiles have the disadvantage that the intermeshing zone is not sealed, as a result of which the pressure build-up capacity of a conveying element based on such screw profiles is low.

Patent EP 2131 A1 depicts, inter alia, tightly intermeshing, self-cleaning, co-rotating screw profiles in which two tip regions wipe the barrel and the distance between a flank region located between two groove regions and the barrel is smaller than or equal to half the flight depth. Such screw profiles have the disadvantage that the distance between said flank region and the barrel is so small that the said flank region acts as a hindrance to flow which impedes the build-up of pressure in a conveying element based on such screw profiles.

Based on the prior art, the problem therefore arose of providing screw elements for multishaft screw-type machines which simultaneously produce as high as possible a pressure build-up, as low as possible thermal and mechanical stresses on the product and as low as possible a resistance to flow.

Surprisingly it has been found that this problem can be solved by screw elements having a specific sequence of flank regions, tip regions and groove regions.

The present invention therefore relates to novel screw elements for multishaft screw-type machines, characterized in that a generating and a generated screw profile have a sequence of sealing region—transition region—channel region—transition region.

A sealing region is understood to be a sequence of tip region—flank region—tip region. A channel region is understood to be a sequence of groove region—flank region—groove region. A transition region is understood to be a sequence of screw profile regions which begins with a flank region and ends with a flank region.

The sealing region of screw elements according to the invention is preferably characterized in that
the flank region relative to the point of rotation of the screw profile has an angle $\delta\_fb1$ which is greater than or equal to half the opening angle between the two barrel intersection points ($\delta\_fb1 \geq \arccos(0.5*a/ra)$) and is preferably greater than or equal to the opening angle between the two barrel intersection points ($\delta\_fb1 \geq 2*\arccos(0.5*a/ra)$),
one tip region relative to the point of rotation of the screw profile has an angle $\delta\_kb1$ which is smaller than or equal to the difference of the tip angle of a one-flight Erdmenger screw profile minus the opening angle between the two barrel intersection points ($\delta\_kb1 \leq \pi - 4*\arccos(0.5*a/ra)$) and which is preferably smaller than or equal to the tip angle of a two-flight Erdmenger screw profile ($\delta\_kb1 \leq \pi/2 - 2*\arccos(0.5*a/ra)$),
the other tip region relative to the point of rotation of the screw profile has an angle $\delta\_kb2$ which is smaller than or equal to the difference of the tip angle of a one-flight Erdmenger screw profile minus the opening angle between the two barrel intersection points ($\delta\_kb2 \leq \pi - 4*\arccos(0.5*a/ra)$) and which is preferably smaller than or equal to the tip angle of a two-flight Erdmenger screw profile ($\delta\_kb2 \leq \pi/2 - 2*\arccos(0.5*a/ra)$).

The sum of the angles of the tip and flank regions $\delta\_kb1$, $\delta\_kb2$ and $\delta\_fb1$ of the sealing region preferably lies in the range from $0.75*\delta\_gz$ to $2*\delta\_gb+\delta\_gz$. In one particularly preferred embodiment, the sum of the angles of the tip and flank regions $\delta\_kb1$, $\delta\_kb2$ and $\delta\_fb1$ of the sealing region lies in the range from $\delta\_gz$ to $\delta\_gb+\delta\_gz$.

The channel region of screw elements according to the invention is preferably characterized in that
the flank region relative to the point of rotation of the screw profile has an angle $\delta\_fb2$ which is greater than or equal to half the opening angle between the two barrel intersection points ($\delta\_fb2 \geq \arccos(0.5*a/ra)$) and which is preferably larger than or equal to the opening angle between the two barrel intersection points ($\delta\_fb2 \geq 2*\arccos(0.5*a/ra)$) and the minimum distance between the flank region and the screw radius ra is larger than half the flight depth h,
one groove region relative to the point of rotation of the screw profile has an angle $\delta\_nb1$ which is smaller than or equal to the difference of the tip angle of a one-flight Erdmenger screw profile minus the opening angle between the two barrel intersection points ($\delta\_nb1 \pi - 4*\arccos(0.5*a/ra)$) and which is preferably smaller than or equal to the tip angle of a two-flight Erdmenger screw profile ($\delta\_nb1 \leq \pi/2 - 2*\arccos(0.5*a/ra)$),
the other groove region relative to the point of rotation of the screw profile has an angle $\delta\_nb2$ which is smaller than or equal to the difference of the tip angle of a one-flight Erdmenger screw profile minus the opening angle between the two barrel intersection points ($\delta\_nb2 \geq \pi - 4*\arccos(0.5*a/ra)$) and which is preferably smaller than or equal to the tip angle of a two-flight Erdmenger screw profile ($\delta\_nb2 \leq \pi/2 - 2*\arccos(0.5*a/ra)$).

The sum of the angles of the groove and flank regions $\delta\_nb1$, $\delta\_nb2$ and $\delta\_fb2$ of the channel region preferably lies in the range from $0.75*\delta\_gz$ to $2*\delta\_gb+\delta\_gz$. In one particularly preferred embodiment, the sum of the angles of the groove and flank regions $\delta\_nb1$, $\delta\_nb2$ and $\delta\_fb2$ of the channel region lies in the range from $\delta\_gz$ to $\delta\_gb+\delta\_gz$.

The transition region is characterized in that it starts with a flank region and ends with a flank region. The transition region preferably consists of a sequence of flank region—tip region—flank region or of a sequence of flank region—groove region—flank region or of a sequence of flank region—tip region—flank region—groove region—flank region or of a sequence of flank region—groove region—flank region—tip region—flank region. In one particularly preferred embodiment, the transition region consists of a flank region. In this case, the transition region begins and ends with this one said flank region.

The invention is not restricted to screw elements from the currently customary modular design of a screw from screw elements and core shafts, but rather can also be used in screws of solid design. Therefore, the expression "screw elements" is also to be understood to mean screws of solid design.

The screw elements according to the invention can be used as conveying, kneading and/or mixing elements.

As is known (see, for example pages 227-248 of [1]), a conveying element is characterized by the fact that the screw profile continuously rotates and extends in a screw-like fashion in an axial direction. The conveying element can be right- or left-handed. The pitch of the conveying element, i.e. the axial length required for a complete rotation of the screw profile, is preferably in the range from 0.1 to 10 times the centre distance and the axial length of a conveying element is preferably in the range from 0.1 to 10 times the centre distance.

As is known (see, for example pages 227-248 of [1]), a kneading element is characterized by the fact that the screw profile extends in an axial direction in steps in the form of kneading discs. These kneading discs can be arranged in a right-handed, left-handed or neutral fashion. The axial length of the kneading discs is preferably in the range from 0.05 to 10 times the centre distance. The axial distance between two adjacent kneading discs is preferably in the range from 0.002 to 0.1 times the centre distance.

As is known (see, for example, pages 227-248 of [1]), mixing elements are formed by designing conveying elements with openings in the screw tips. The mixing elements can be right-handed or left-handed. Their pitch is preferably in the range from 0.1 to 10 times the centre distance and the axial length of the elements is preferably in the range from 0.1 to 10 times the centre distance. The openings are preferably designed in the form of a u- or v-shaped groove and they are preferably arranged in a backward-conveying manner or parallel to the axis.

Those skilled in the art are aware of the fact that fully abrading screw profiles cannot be directly incorporated in twin-screw extruders and that clearances between the screws are actually required. Many different possible strategies are described for this purpose on pages 28 et seq. of [1]. For the screw profiles of screw elements according to the invention clearances in the range from 0.001 to 0.1, based on the diameter of the screw profile, preferably in the range from 0.002 to 0.05 and particular preferably from 0.004 to 0.02 can be used. As is known to those skill in the art, these clearances can be different in size or identical between the screw and the barrel and between one screw and another. They can also be constant or variable within the specified limits. It is also possible to shift a screw profile within the clearances. Possible clearance strategies are those described on page 28 et seq. of [1] of increasing the centre distance, of longitudinal equidistant clearance or of three-dimensional equidistant clearance. All of these strategies are known to those of ordinary skill in the art. In the case of increasing the centre distance a screw profile with a smaller diameter is constructed and pulled apart by the size of the clearance between the screws. In the case of the method of longitudinal equidistant clearance the profile contour of the longitudinal section (parallel to the axis) is shifted inwards by half the clearance between the screws. In the case of the method of three-dimensional equidistant clearance, starting from the three-dimensional curved contour along which the screw elements wipe each other, the screw element is reduced in size in a vertical direction to the surfaces of the fully abrading profile by half the clearance between the screws. Preferably longitudinal equidistant clearance and three-dimensional equidistant clearance are used. Particularly preferably three-dimensional equidistant clearance is used.

The present invention also relates to a method of generating the novel screw elements according to the invention.

In general planar, tightly intermeshing, self-cleaning, co-rotating screw profiles can be generated by the general method described in the following.

The general method of generating planar, tightly intermeshing, self-cleaning, co-rotating screw profiles with a selectable centre distance a between the axes of rotation of a generating and a generated screw profile is characterized in that the generating screw profile consists of n arcs and the generated screw profile consists of n' arcs, wherein the generating screw profile and the generated screw profile lie in the same plane, the axis of rotation of the generating screw profile and the axis of rotation of the generated screw profile each lie vertically on said plane of the screw profiles, the point of intersection between the rotational axis of the generating screw profile and said plane being referred to as the point of rotation of the generating screw profile and the point of intersection between the rotational axis of the generated screw profile and said plane being referred to as the point of rotation of the generated screw profile, the number of arcs n of the generating screw profile is selected such that n is an integer greater than or equal to 1, an outer radius ra of the generating screw profile is selected such that ra can be greater than 0 (ra>0) and smaller than or equal to the centre distance (ra≤a), an inner radius ri of the generating screw profile is selected such that ri can be greater than or equal to 0 (ri≥0) and smaller than or equal to ra (ri≤ra), the arcs of the generating screw profile are arranged clockwise or anti-clockwise about the rotational axis of the generating screw profile in such a manner, according to the following configuration rules, that:

all of the arcs of the generating screw profile merge into each other tangentially such that a closed, convex screw profile is obtained, wherein an arc whose radius is 0 is treated as an arc whose radius is eps, which is a very small positive real number which tends towards 0 (eps<<1, eps→0), all of the arcs of the generating screw profile are located within or on the boundaries of an annulus which has the outer radius ra and the inner radius ri and whose centre point is located on the point of rotation of the generating screw profile, at least one of the arcs of the generating screw profile touches the outer radius ra of the generating screw profile, at least one of the arcs of the generating screw profile touches the inner radius ri of the generating screw profile, the size of a first arc of the generating screw profile which is defined by an angle $\alpha\_1$ and a radius $r\_1$ is selected such that angle $\alpha\_1$ is, in terms of radian measurement, greater than or equal to 0 and smaller than or equal to $2\pi$, wherein $\pi$ is understood to be pi ($\pi\approx3.14159$), and radius $r\_1$ is greater than or equal to 0 and smaller than or equal to the centre distance a, and the position of this first arc of the generating screw profile, which is obtained by positioning two different points of this first arc, is defined according to the above configuration rules, wherein a first point of this first arc to be positioned is preferably a starting point of this first arc and wherein a second point of this first arc to be positioned is preferably the centre point of this first arc, the sizes of additional n−2 arcs of the generating screw profile, which are defined by angles $\alpha\_2, \ldots, \alpha\_(n-1)$ and radii $r\_2, \ldots, r\_(n-1)$ are selected such that angles $\alpha\_2, \ldots, \alpha\_(n-1)$ are, in terms of radian measurement, greater than or equal to 0 and smaller than or equal to $2\pi$ and radii $r\_2, \ldots, r\_(n-1)$ are greater than or equal to 0 and smaller than or equal to the centre distance a, and the positions of these additional n−2 arcs of the generating screw profile are defined according to the above configuration rules, the size of a last arc of the generating screw profile, which is defined by angle $\alpha\_n$ and radius $r\_n$, is defined such that the sum of the n angles of the n arcs of the generating screw profile is, in terms of radian measurement, $2\pi$, wherein angle $\alpha\_n$ is, in terms of radian measurement, greater than or equal to 0 and smaller than or equal to $2\pi$, and radius $r\_n$ closes the generating screw profile, wherein radius $r\_n$ is greater than or equal to 0 and smaller than or equal to the centre distance a and the position of this last arc of the generating screw profile is defined according to the above configuration rules, the n' arcs of the generated screw profile are obtained from the n arcs of the generating screw profile as a result of the fact that the number of arcs n' of the generated screw profile is identical to the number of arcs n of the generating screw profile, wherein n' is an integer, the outer radius ra' of the generated screw profile is equal to the centre distance minus the inner radius ri of the generating screw profile (ra'=a−ri), the inner radius ri' of the generated screw profile is equal to the centre distance minus the outer radius ra of the generating screw profile (ri'=a−ra), angle $\alpha\_i'$ of the i'nth arc of the generated screw profile is the same as angle $\alpha\_i$ of the inth arc of the generating screw profile, wherein i and i' are integers which together represent all values in the range from 1 to the number of arcs n and n' respectively ($\alpha\_1'=\alpha\_1, \alpha\_n'=\alpha\_n$), the sum of radius r_i' of the i'nth arc of the generated screw profile and radius r_i of the inth arc of the generating screw profile is equal to the centre distance a, wherein i and i' are integers which together represent all values in the range from 1 to the number of arcs n and n' respectively (r_1'+r_1=a, . . . , r_n'+r_n=a), the distance between the centre point of the i'nth arc of the generated screw profile and the centre point of the inth arc of the generating screw profile equals the centre distance a and the distance between the centre point of the i'nth arc of the generated screw profile and the point of rotation of the generated screw profile is the same as the distance between the centre point of the inth arc of the generating screw profile and the point of rotation of the generating screw profile, and the connecting line between the centre point of the i'nth arc of the generated screw profile and the centre point of the inth arc of the generating screw profile is a line parallel to a connecting line between the point of rotation of the generated screw profile and the point of rotation of the generating screw profile, wherein i and i' are integers which together represent all values in the range from 1 to the number of arcs n and n' respectively (i'=i), a starting point of the i'nth arc of the generated screw profile lies in an opposite direction, in relation to the centre point of the i'nth arc of the generated screw profile, to that of a starting point of the inth arc of the generating screw profile, in relation to the centre point of the inth arc of the generating screw profile, wherein i and i' are integers which together represent all values in the range from 1 to the number of arcs n and n' respectively (i'=i).

The general method for generating planar, tightly intermeshing, self-cleaning, co-rotating screw profiles produces the following features in the generated screw profile:

the generated screw profile is closed, the generated screw profile is convex, each of the arcs of the generated screw profile merges tangentially into the next arc of the generated screw profile, wherein an arc with a radius of 0 is treated as an arc with a radius of eps, which is a very small positive real number which tends towards 0 (eps<<1, eps→0), all of the arcs of the generated screw profile are located within or on the boundaries of an annulus which has the outer radius ra' and the inner radius ri' and whose centre point is located on the point of rotation of the generated screw profile, at least one of the arcs of the generated screw profile touches the outer radius ra' of the generated screw profile, at least one of the arcs of the generated screw profile touches the inner radius ri' of the generated screw profile.

The general method of generating planar, tightly intermeshing, self-cleaning, co-rotating screw profiles also means that only if the inner radius ri of the generating screw profile equals the centre distance a minus the outer radius ra of the generating screw profile (ri=a−ra), is the outer radius ra' of the generated screw profile identical to the outer radius ra of the generating screw profile and the inner radius ri' of the generated screw profile identical to the inner radius ri of the generating screw profile.

If the generating screw profile has an arc with the radius r_i=0, the screw profile has, at this point of the arc, a kink whose size is characterized by the angle $\alpha\_i$. If the generated screw profile has an arc with the radius r_i'=0, the screw profile has, at this point of the arc, a kink whose size is characterized by the angle $\alpha\_i'$.

The general method of generating planar, tightly intermeshing, self-cleaning, co-rotating screw profiles is also characterized in that it can be carried out merely by using an angle ruler and a pair of compasses. Thus the tangential transition between the inth and the (i+1)nth arc of the generating screw profile is constructed by forming a circle with the radius r_(i+1) around the end point of the inth arc, and that point of intersection between this circle and a straight line through the centre point and the end point of the inth arc which is located nearer the point of rotation of the generating screw profile is the centre point of the (i+1)nth arc. In practice, instead of an angle ruler and a pair of compasses, a computer program is used for constructing these screw profiles.

The screw profiles generated by this general method are independent of a number of flights z.

The generated screw profile can be different from the generating screw profile. As is readily understandable to those skilled in the art from the present description, this general method is particularly suitable for generating transition elements between screw elements having different numbers of flights. Based on a screw profile with z flights it is possible to change the generating and the generated screw profile gradually in such a manner that finally a screw profile with a number of flights z' which is not equal to z is obtained. It is permissible in this case to reduce or increase the number of arcs during this transition.

Typical screw profiles used in practice are characterized in that the generating and the generated screw profiles are identical for an odd number of flights and, for an even number of flights, the generated screw profile is identically superimposable on the generating screw profile on rotating the generating or generated screw profile through an angle $\pi/z$. Such screw profiles known according to the prior art and having z flights are characterized in that they have precisely z planes of symmetry which are vertical to the plane of the generating screw profile and pass through the axis of rotation of the generating screw profile. The same applies to the generated screw profile. The screw profiles each consist of 2*z sections which have a section angle of $\pi/z$ based on the respective point of rotation of the corresponding screw profile and can be superimposed on each other on rotation or mirroring at their planes of symmetry. Such screw profiles are referred to as symmetrical. In a first special method for generating planar, tightly intermeshing, self-cleaning, co-rotating screw profiles, a flight number z applies, which subdivides the screw profiles into 2*z sections. Using this first special method it is however possible to generate not only symmetrical screw profiles in which the 2*z sections can be superimposed on each other by rotation and/or mirroring at their planes of symmetry but also asymmetrical screw profiles.

This first special method is characterized by selecting a number of flights z, wherein z is an integer greater than or equal to 1, by selecting the number of arcs n of the generating screw profile such that it is an integer multiple p of 4*z, in that the generating screw profile is subdivided into 2*z sections, which are characterized in that each section is bounded by two straight lines which form an angle to each other, in terms of radian measurement, of $\pi/z$ and which intersect each other at the point of rotation of the generating screw profile, wherein these two straight lines are referred to as section boundaries, wherein π is pi (π≈3.14159), each of these 2*z sections is subdivided into a first and a second part, the first part of a section is composed of p arcs which are numbered in ascending or descending order, the angles α_1, . . . , α_p belonging to the p arcs are selected such that the sum of these angles is π/(2*z), wherein angles α_1 . . . , α_p are, in terms of radian measurement, greater than or equal to 0 and smaller than or equal to π/(2*z), the second part of a section is composed of p' arcs, which are numbered in reverse order like the arcs of the first part of a section, wherein p' is an integer which is the same as p, angles α_p', . . . , α_1' of the p' arcs are defined such that the angle α_j' of the j'th arc of the second part of a section is the same as the angle α_j of the jth arc of the first part of a section, wherein j and j' are integers which together represent all values in the range from 1 to the number of arcs p and p' respectively (α_1'=α_1, . . . , α_p'=α_p), the sum of the radius r_j' of the j'th arc of the second part of a section and the radius r_j of the jth arc of the first part of a section is equal to the centre distance a, wherein j and j' are integers which together represent all values in the range from 1 to the number of arcs p and p' respectively (r_1'+r_1=a, . . . , r_p'+r_p=a), a centre point and a starting point of the arc with which the screw profile begins in the first part of a section are positioned on one of the section boundaries of this section, depending on whether the arcs are arranged in a clockwise or an anticlockwise direction, an end point of the arc with which the screw profile ends in the first part of a section touches a straight line FP at one point, the straight line FP being vertically on the angle bisector of the two section boundaries of this section and at such a distance from the point of rotation of the generating screw profile in the direction of this section which is equal to half the centre distance, the angle bisector passing, in the same way as the section boundaries, through the point of rotation of the generating screw profile.

This first special method of generating planar, tightly intermeshing, self-cleaning, co-rotating screw profiles with z flights produces such a generated screw profile that each of the sections of the generated screw profile is designed such that the radii of the arcs of the generated screw profile are, in reverse order, the same as the radii of the arcs of the generating screw profile.

Screw profiles which are generated according to the first special method consist of 2*z sections which can be different from each other. If the sections are different from each other, the screw profiles are asymmetrical.

In the case of symmetrical screw profiles all 2*z sections can be identically superimposed on being rotated and/or mirrored at the section boundaries. The section boundaries are then located on the lines of intersection between the planes of symmetry of the respective profile and the plane in which the profile lies. This therefore represents a second special method of generating planar, symmetrical, tightly intermeshing, self-cleaning, co-rotating screw profiles with z flights. This second special method is characterized in that only a first section of the generating screw profile is predefined, and the additional sections are generated by successive minoring at the section boundaries.

These special methods are also characterized in that they can be carried out merely by using an angle ruler and a pair of compasses. Thus the tangential transition between the jth and the (j+1)th arc of the first part of a section of the generating screw profile is constructed by forming a circle with the radius r_(j+1) around the end point of the jth arc and that point of intersection of this circle with the straight line through the centre point and the end point of the jth arc which is located nearer the point of rotation of the generating screw profile is the centre point of the (j+1)th arc. In addition, with increasing numbering of the arcs, the pth arc of the first part of a section of the generating screw profile is constructed in such a manner that a tangent is placed on the (p−1)th arc at the end point of the (p−1)th arc, the point of intersection between the tangent and the straight line FP is the centre point of a circle whose radius is equal to the length of the distance between the end point of the (p−1)th arc and the point of intersection between the tangent and the straight line FP, and the point of intersection located in the direction of the selected clock direction between the circle and the straight line FP is the required point of contact between the end point of the pth arc and the straight line FP. In practice, instead of an angle ruler and a pair of compasses, a computer program is used for constructing the screw profiles.

As is readily understandable to a person of ordinary skill in the art from the present description, these special methods are also suitable for generating transition elements between screw elements with an identical number of flights. Based on a screw profile with z flights it is possible to obtain a different z-flight screw profile by gradually changing the screw profile in the transition. It is permissible to decrease or increase the number of arcs during the transition.

Both the general method and the special methods are suitable for generating profiles of screw elements according to the invention. For this purpose the arcs for forming the generating and the generated screw profile are to be arranged in such a manner that the screw profiles consist of the sequence of sealing region—transition region—channel region—transition region.

For the sealing region which consists of a sequence of tip region—flank region—tip region, the following preferably applies:

the flank region relative to the point of rotation of the screw profile has an angle δ_fb1 which is greater than or equal to half the opening angle between the two barrel intersection points (δ_fb1≥arccos(0.5*a/ra)) and is preferably greater than or equal to the opening angle between the two barrel intersection points (δ_fb1≥2*arccos(0.5*a/ra)), one tip region relative to the point of rotation of the screw profile has an angle δ_kb1 which is smaller than or equal to the difference of the tip angle of a one-flight Erdmenger screw profile minus the opening angle between the two barrel intersection points (δ_kb1≤π−4*arccos(0.5*a/ra)) and which is preferably smaller than or equal to the tip angle of a two-flight Erdmenger screw profile (δ_kb1≤π/2−2*arccos(0.5*a/ra)), the other tip region relative to the point of rotation of the screw profile has an angle δ_kb2 which is smaller than or equal to the difference of the tip angle of a one-flight Erdmenger screw profile minus the opening angle between the two barrel intersection points (δ_kb2≤π−

4*arccos(0.5*a/ra)) and which is preferably smaller than or equal to the tip angle of a two-flight Erdmenger screw profile ($\delta\_kb2 \leq \pi/2 - 2*arccos(0.5*a/ra)$).

The sum of the angles of the tip and flank regions $\delta\_kb1$, $\delta\_kb2$ and $\delta\_fb1$ of the sealing region preferably lies in the range from $0.75*\delta\_gz$ to $2*\delta\_gb+\delta\_gz$. In one particularly preferred embodiment, the sum of the angles of the tip and flank regions $\delta\_kb1$, $\delta\_kb2$ and $\delta\_fb1$ of the sealing region lies in the range from $\delta\_gz$ to $\delta\_gb+\delta\_gz$.

For the channel region, which consists of a sequence of groove region—flank region—groove region, the following preferably applies:

the flank region relative to the point of rotation of the screw profile has an angle $\delta\_fb2$ which is greater than or equal to half the opening angle between the two barrel intersection points ($\delta\_fb2 \geq arccos(0.5*a/ra)$) and which is preferably larger than or equal to the opening angle between the two barrel intersection points ($\delta\_fb2 \geq 2*arccos(0.5*a/ra)$), and the minimum distance of the flank region from the screw radius ra is greater than half the flight depth h, one groove region relative to the point of rotation of the screw profile has an angle $\delta\_nb1$ which is smaller than or equal to the difference of the tip angle of a one-flight Erdmenger screw profile minus the opening angle between the two barrel intersection points ($\delta\_nb1 \leq \pi - 4*arccos(0.5*a/ra)$) and which is preferably smaller than or equal to the tip angle of a two-flight Erdmenger screw profile ($\delta\_{nb1} \leq \pi/2 - 2*arccos(0.5*a/ra)$), the other groove region relative to the point of rotation of the screw profile has an angle $\delta\_nb2$ which is smaller than or equal to the difference of the tip angle of a one-flight Erdmenger screw profile minus the opening angle between the two barrel intersection points ($\delta\_nb2 \leq \pi - 4*arccos(0.5*a/ra)$) and which is preferably smaller than or equal to the tip angle of a two-flight Erdmenger screw profile ($\delta\_nb2 \leq \pi/2 - 2*arccos(0.5*a/ra)$).

The sum of the angles of the groove and flank regions $\delta\_nb1$, $\delta\_nb2$ and $\delta\_fb2$ of the channel region preferably lies in the range from $0.75*\delta\_gz$ to $2*\delta\_gb+\delta\_gz$. In one particularly preferred embodiment, the sum of the angles of the groove and flank regions $\delta\_nb1$, $\delta\_nb2$ and $\delta\_fb2$ of the channel region lies in the range from $\delta\_gz$ to $\delta\_gb+\delta\_gz$.

The transition region is characterized in that it starts with a flank region and ends with a flank region. The transition region preferably consists of a sequence of flank region—tip region—flank region or of a sequence of flank region—groove region—flank region or of a sequence of flank region—tip region—flank region—groove region—flank region or of a sequence of flank region—groove region—flank region—tip region—flank region. In one particularly preferred embodiment, the transition region consists of a flank region. In this case, the transition region begins and ends with this one said flank region.

It is recommendable to carry out the said methods of generating screw profiles using a computer. The dimensions of the screw elements are then in a form in which they can be entered into a CAD milling machine for generating the screw elements.

After the profile has been generated in the above manner the screw elements according to the invention can be generated, for example, using a milling machine. Preferred materials for generating the screw elements are steels and in particular nitrated steels and stainless steels.

The present invention also relates to the use of the screw elements according to the invention in multishaft screw-type machines. Preferably the screw elements according to the invention are used in twin-shaft screw-type machines. The screw elements can be present in the multishaft screw-type machines in the form of kneading or conveying elements. It is also possible to combine kneading and conveying elements with each other in one screw-type machine. The screw elements according to the invention can also be combined with other screw elements which are known from the prior art.

The novel screw elements according to the invention are characterized in that they do not have the abovementioned disadvantages of screw elements known according to the prior art. In particular, the screw elements according to the invention allow the intermeshing zone to be sealed in such a manner that one tip region is always located in a barrel intermeshing zone, as a result of which the pressure build-up capacity of conveying elements based on such screw profiles is high.

A preferred embodiment of screw elements according to the invention has tip regions which are as small as possible, thereby minimizing the thermal and mechanical stresses on the product.

In a preferred embodiment of screw elements according to the invention, the flank region located between two groove regions is at a distance from the barrel which is larger than half the flight depth, thereby keeping the resistance to flow small.

In a preferred embodiment, the screw elements subject-matter of the have an identical screw profile for all of the shafts of a multishaft extruder or for the two shafts of a twin-shaft extruder.

The invention is illustrated by way of example in more detail in the following with the aid of the figures without however being limited to these figures. All the figures have been obtained with the aid of a computer program.

It is recommendable to use dimensionless parameters for generating and/or defining screw profiles and elements in order to simplify the process of applying the method to various extruder sizes. The centre distance a is a useful reference parameter for geometrical parameters such as, for example, lengths or radii, since this parameter cannot be changed in an extruder. The dimensionless centre distance is $A=a/a=1$. The dimensionless outer screw radius of a screw profile is $RA=ra/a$. The dimensionless inner radius of a screw profile is $RI=ri/a$. The dimensionless flight depth of a screw profile is $H=h/a=RA-RI$.

In the figures all of the geometrical parameters are used in their dimensionless form. All of the angles are stated in terms of radian measurement.

Figure 25:
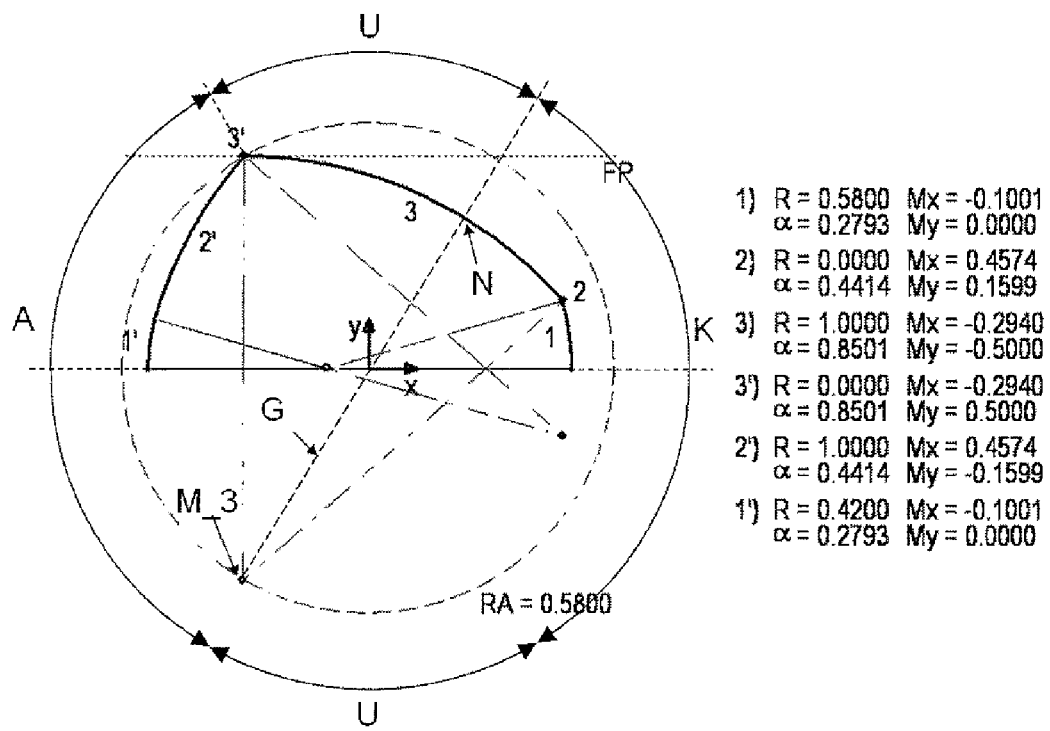

FIG. 25 depicts a cross-section of one half of a screw profile of a screw element according to the invention. The xy coordinate system, at whose origin the point of rotation of the screw profile is located, is in the middle of the figure. The arcs of the screw profile are depicted by thick, continuous lines which are labeled with the respective arc numbers. The centre points of the arcs are depicted by small circles. The centre point of each arc is connected by thin, continuous lines to its starting and end points. The straight line FP is depicted by a thin dotted line. The outer screw radius RA is characterized by a thin, broken line and its numerical value is given to four significant digits at the bottom right of each figure. On the righthand side of the figures the radius R, the angle $\alpha$ and the x and y coordinates of the centre point Mx and My of each arc are given to four significant digits. The screw profile is clearly defined by these values. The screw profile is mirror-symmetrical to the x-axis, so that the entire screw profile would be obtained by mirroring the half depicted at the x-axis.

Those regions of a screw profile which have the same radius as the outer screw radius are referred to as tip regions. In the example shown in FIG. 25 this is only arc 3', which touches the outer screw radius. This arc has a radius of R_3'=0, i.e. at this point the profile has a kink. The centre point of arc 3' coincides with the kink. The "size of the kink" is determined by angle α_3' (α_3'=0.8501), i.e. the transition from arc 3 to arc 2' takes place by rotation about angle α_3'. Or in other words: A tangent on arc 3 at the centre point of arc 3' intersects a tangent on arc 2' also at the centre point of arc 3' at an angle α_3'. With the inclusion of arc 3' all of the adjacent arcs 3→3', 3'→2' do however merge tangentially into each other.

Those regions of a screw profile which have the same radius as the inner radius are referred to as groove regions. In the example in FIG. 25 this is only one point N on arc 3. Point N is obtained by drawing a straight line G through the centre point M_3 of arc 3 and the point of rotation of the profile. This straight line G intersects arc 3 at point N.

Those regions of a screw profile which have a radius smaller than the outer screw radius and larger than the inner radius are referred to as flank regions. In the example of FIG. 25 these are arc 1, arc 2, arc 2', arc 1' and arc 3 excluding point N. Thus, for the depicted profile section beginning with arc 1' and ending with arc 1, the following sequence of regions applies: flank—flank—tip—flank—groove—flank—flank—flank. Due to the axial symmetry of the profile, these regions are copied by mirroring about the x-axis. This results in the overall profile with the sequence according to the invention: A-U-K-U, in which A represents a sealing region, U represents a transition region and K represents a channel region. The sealing region has the sequence: tip region—flank region—tip region. The channel region has the sequence: groove region—flank region—groove region. The transition region has one flank region.

The sealing region is characterized in that the screw profile has a kink at the transition from the flank region to the tip region. In addition, the screw profile of this figure is characterized in that the transition from the sealing region to the transition region has a kink. The smallest dimensionless distance between the flank region of the channel region and the dimensionless outer screw radius RA is 0.1001 and it is therefore larger than half the dimensionless flight depth H/2=0.08.

In the following, additional screw elements according to the invention are described. In order to provide a better overview, the regions (flank region, tip region, groove region, sealing region, channel region and transition region) are not marked in the figures. The figures do however contain all the information required for determining the regions. In addition, parameters such as the opening angles between the two barrel intersection points and the tip angle can be readily calculated from the information contained in the figures.

FIGS. 1 to 13 each depict a cross-section of one half of a screw profile of a screw element according to the invention. All of these figures have the same layout, which is described in detail in the following. The xy coordinate system, at whose origin the point of rotation of the screw profile is located, is in the middle of the figures. The arcs of the screw profile are depicted by thick, continuous lines which are labeled with the respective arc numbers. The centre points of the arcs are depicted in the form of small circles. The centre point of each arc is connected by thin, continuous lines to its starting and end points. The straight line FP is depicted by a thin dotted line. The outer screw radius RA is characterized by a thin, broken line and its numerical value is given to four significant digits at the bottom right of each figure. On the righthand side of the figures the radius R, the angle α and the x and y coordinates of the centre point, Mx and My, of each arc are given to four significant digits. The screw profile is clearly defined by these values. Each of the screw profiles are mirror-symmetrical to the x-axis, so that the entire screw profiles would be obtained by mirroring the depicted half at the x-axis.

Screw profiles in which half of the screw profile consists of a total of 2 arcs are referred to hereinafter as 2-circle screw profiles. Screw profiles in which half of the screw profile consists of a total of 4 arcs are referred to hereinafter as 4-circle screw profiles. Screw profiles in which half of the screw profile consists of a total of 6 arcs are referred to hereinafter as 6-circle screw profiles. Screw profiles in which half of the screw profile consists of a total of 8 arcs are referred to hereinafter as 8-circle screw profiles.

FIG. 1: FIGS. 1a to 1d each depict half of a preferred screw profile of a screw element according to the invention consisting of 8 arcs. In FIGS. 1a to 1d the dimensionless outer screw radius RA is 0.58. In FIGS. 1a to 1d the dimensionless flight depth is H=0.16. The other geometrical parameters which precisely define the screw profiles can be found in the figures. A characteristic feature of the screw profiles in FIGS. 1a to 1d is that the sealing region comprises arcs 1 to 4, the flank region comprising arc 1 and the tip region arcs 2 to 4, wherein the dimensionless radius of arcs 2 and 4 is in each case 0 and the dimensionless radius of arc 3 is the same as the dimensionless outer screw radius RA and wherein the arcs of the tip region are located completely on the dimensionless outer screw radius RA, thereby producing a linear sealing of the intermeshing zone. In addition, it is a characteristic feature of these screw profiles that the transition region includes arc 4', whose dimensionless radius is equal to the dimensionless centre distance A. In addition, these screw profiles are characterized in that the channel region comprises arcs 1' to 3', the flank region comprising arcs 1' and 2' and the groove region comprising arc 3', the dimensionless radius of arc 2' corresponding to the dimensionless centre distance A and the dimensionless radius of arc 3' corresponding to the dimensionless inner radius RI and the arc of the groove region being located completely on the dimensionless inner radius RI. In FIGS. 1a to 1d the sealing regions are characterized in that the screw profiles each have a kink at the transition from the flank region to the tip region. In addition, the screw profiles of these figures are characterized in that the transition from the sealing region to the transition region in each case comprises a kink. FIG. 1d depicts the smallest dimensionless distance between the flank region of the channel region and the dimensionless outer screw radius RA. In FIG. 1d said distance is 0.0801 and it is therefore larger than half the dimensionless flight depth H/2=0.08.

It is clear from FIGS. 1a to 1d that the size of the tip region of the sealing region can be adjusted. It is also clear from these figures that the maximum distance between the flank region of the sealing region and the outer screw radius can be adjusted.

FIGS. 1b and 1c are also characterized in that the position of the starting point of arc 1 and the position of the end point of arc 1' are in each case identical. By mirroring FIG. 1b or FIG. 1c at the x-axis and by combining the screw profile from the screw profile of FIG. 1b and the mirrored screw profile of FIG. 1c or from the screw profile of FIG. 1c and the mirrored screw profile of FIG. 1b screw profiles of a screw element according to the invention are obtained in which the tip regions of the sealing region vary in size.

FIG. 2: FIGS. 2a to 2d each show half of a preferred screw profile of a screw element according to the invention consisting of 8 arcs. In FIGS. 2a to 2d the dimensionless outer screw radius varies over a range from RA=0.55 to RA=0.67. In FIGS. 2a to 2d the dimensionless flight depth varies over a range from H=0.10 to H=0.34. The additional geometrical parameters which precisely define the screw profiles can be found in the figures. A characteristic feature of the screw profiles in FIGS. 2a to 2d is that the sealing region comprises arcs 1 to 4, the flank region comprising arc 1 and the tip region arcs 2 to 4, wherein the dimensionless radius of arcs 2 and 4 is in each case 0 and the dimensionless radius of arc 3 is the same as the dimensionless outer screw radius RA and wherein the arcs of the tip region are located completely on the dimensionless outer screw radius RA, thereby producing a linear sealing of the intermeshing zone. In addition, it is a characteristic feature of these screw profiles that the transition region includes arc 4', whose dimensionless radius is the same as the dimensionless centre distance A. In addition, these screw profiles are characterized in that the channel region comprises arcs 1' to 3', the flank region comprising arcs 1' and 2' and the groove region comprising arc 3', the dimensionless radius of arc 2' corresponding to the dimensionless centre distance A and the dimensionless radius of arc 3' corresponding to the dimensionless inner radius RI and the arc of the groove region being located completely on the dimensionless inner radius RI. In FIGS. 2a to 2d the sealing regions are characterized in that the screw profiles each have a kink at the transition from the flank region to the tip region. In addition, the screw profiles in these figures are characterized in that the transition from the sealing region to the transition region in each case comprises a kink. FIG. 2d has the smallest dimensionless distance between the flank region of the channel region and the dimensionless outer screw radius RA. In FIG. 2d said distance is 0.06 and it is therefore larger than half the dimensionless flight depth H/2=0.05.

FIG. 3: FIGS. 3a and 3b each depict half of a preferred screw profile of a screw element according to the invention consisting of 8 arcs. In FIGS. 3a and 3b the dimensionless outer screw radius RA is 0.58. In FIGS. 3a to 3d the dimensionless flight depth H is 0.16. The additional geometrical parameters which precisely define the screw profiles can be found in the figures. A characteristic feature of the screw profiles in FIGS. 3a and 3b is that the sealing region comprises arcs 1 to 4, the flank region comprising arcs 1 and 2 and the tip region arcs 3 and 4, wherein the dimensionless radius of arc 3 is the same as the dimensionless outer screw radius RA and the dimensionless radius of arc 4 is 0 and wherein the arcs of the tip region are located completely on the dimensionless outer screw radius RA, thereby producing a linear sealing of the intermeshing zone. In addition, it is a characteristic feature of these screw profiles that the transition region includes arc 4', whose dimensionless radius is the same as the dimensionless centre distance A. In addition, these screw profiles are characterized in that the channel region comprises arcs 1' to 3', the flank region comprising arcs 1' and 2' and the groove region comprising arc 3', the dimensionless radius of arc 3' corresponding to the dimensionless inner radius RI and the arc of the groove region being located completely on the dimensionless inner radius RI. In FIGS. 3a and 3b the sealing regions are characterized in that the screw profiles in each case do not have a kink at the transition from the flank region to the tip region. In addition, the screw profiles of these figures are characterized in that the transition from the sealing region to the transition region in each case comprises a kink. FIG. 3b has the smallest dimensionless distance between the flank region of the channel region and the dimensionless outer screw radius RA. In FIG. 3b said distance is 0.0924 and it is therefore larger than half the dimensionless flight depth H/2=0.08.

FIG. 4: FIGS. 4a and 4b each depict half of a preferred screw profile of a screw element according to the invention consisting of 8 arcs. In FIGS. 4a and 4b the dimensionless outer screw radius RA is 0.58. In FIGS. 4a to 4d the dimensionless flight depth is H=0.16. The additional geometrical parameters which precisely define the screw profiles can be found in the figures. A characteristic feature of the screw profiles in FIGS. 4a and 4b is that the sealing region comprises arcs 1 to 3, the flank region comprising arcs 1 and 2 and the tip region arc 3, wherein the dimensionless radius of arc 3 is the same as the dimensionless outer screw radius RA and wherein the arc of the tip region is located completely on the dimensionless outer screw radius RA, thereby producing a linear seal of the intermeshing zone. In addition, it is a characteristic feature of these screw profiles that the transition region includes arcs 4 and 4'. In addition, these screw profiles are characterized in that the channel region comprises arcs 1' to 3', the flank region comprising arcs 1' and 2' and the groove region comprising arc 3', the dimensionless radius of arc 3' corresponding to the dimensionless inner radius RI and the arc of the groove region being located completely on the dimensionless inner radius RI. In FIGS. 4a and 4b the sealing regions are characterized in that the screw profiles each have no kink at the transition from the flank region to the tip region. In addition, the screw profiles of these figures are characterized in that the transition from the sealing region to the transition region does not comprise a kink. The smallest dimensionless distance between the flank region of the channel region and the dimensionless outer screw radius RA is the same in FIGS. 4a and 4b. Said distance is 0.0924 and it is therefore larger than half the dimensionless flight depth H/2=0.08.

In addition to the screw profiles depicted in FIGS. 3a, 3b, 4a and 4b, it is possible, as those skilled in the art are aware, to form screw profiles in which the radius of arc 2 is 0 and the radius of arc 4 is larger than 0. As a result, screw profiles are obtained which are characterized in that the sealing region of a screw profile has a kink at the transition between the flank region and the tip region and the transition from the sealing region to the transition region of a screw profile does not have a kink.

The method according to the invention for generating planar, tightly intermeshing, self-cleaning and co-rotating screw profiles with z flights is illustrated by way of example based on the section of a screw profile shown in FIG. 4a.

According to the invention, the screw profile and thus also the section of the screw profile lie in one plane. For the sake of simplicity this plane is placed on the xy-plane of a Cartesian coordinate system. Also for the sake of simplicity the point of rotation of the screw profile is positioned at the origin of the Cartesian coordinate system (x=0, y=0).

According to the invention, the flight number z is selected to be greater than or equal to 1. In the present example, the flight number is z=1. According to the invention, the number of arcs n of the screw profile is selected such that n is an integer multiple p of 4*z. In the present example the number of arcs is selected to be n=16, resulting in p=4. According to the invention, the dimensionless outer screw radius RA of the screw profile is selected such that it is greater than 0 and smaller than or equal to the dimensionless centre distance A. In the present example the dimensionless outer screw radius RA of the screw profile is 0.58. According to the invention, the dimensionless inner radius RI of the screw profile is selected to be greater than or equal to 0 and smaller than or equal to the dimensionless outer screw radius RA. In the present example the dimensionless inner radius RI of the screw profile is A−RA=0.42.

The arcs of the screw profile can be arranged in a clockwise or anti-clockwise direction about the axis of rotation of the screw profile. In the present example, the arcs are arranged in an anti-clockwise direction around the axis of rotation of the screw profile.

The screw profile is subdivided into 2*z sections which are characterized in that each section is enclosed between two straight lines which are at an angle to each other of $\pi/z$ in terms of radian measurement and which intersect each other at the point of rotation of the screw profile, these two straight lines being referred to as section boundaries. In the present example the screw profile is subdivided into two sections. For the sake of simplicity, both section boundaries are located on the x-axis of the coordinate system. In the present example, only that screw profile section is explained hereinbelow which is positioned in the positive y direction.

The screw profile section is subdivided into a first and a second part, the first part consisting of p arcs and the second part consisting of p' arcs, wherein p'=p. In the present example p'=4. The arcs of the first part of the screw profile section can be numbered in ascending or descending order. The arcs of the second part of the screw profile section are numbered in reverse order like the arcs of the first part of the screw profile section. In the present example the arcs of the first part of the screw profile section are numbered in ascending order and the arcs of the second part of the screw profile section are accordingly numbered in descending order.

According to the invention, angle $\alpha\_1$ of arc 1 of the first part of the screw profile section is selected to be, in terms of radian measurement, greater than or equal to 0 and smaller than or equal to $\pi(2*z)$. In the present example the angle of arc 1, $\alpha\_1$, is selected to be 0.4304. According to the invention, the dimensionless radius $R\_1$ of arc 1 of the first part of the screw profile section is selected such that it is greater than or equal to 0 and smaller than or equal to the centre distance A. In the present example the dimensionless radius of arc 1, $R\_1$, is selected to be 0.9061. According to the invention, the position of arc 1 of the first part of the screw profile section is selected such that arc 1 is located within or on the boundary rings of an annulus with the dimensionless outer screw radius RA and the dimensionless inner radius RI, whose centre point is located on the point of rotation of the screw profile. Its position is preferably determined by the positioning of the starting point and the centre point of arc 1. In the method according to the invention the starting point and the centre point of arc 1 are located on one of the section boundaries, the starting point resulting from the position of the centre point and the dimensionless radius $R\_1$. In the present example the centre point of arc 1 is located at coordinate $Mx\_1=-0.3937$, $My\_1=0.0000$ and the starting point is accordingly located at coordinate $x=0.5124$, $y=0.0000$.

According to the invention, the angles $\alpha\_2, \ldots, \alpha\_(p-1)$ of p−2 additional arcs, i.e. 2 additional arcs of the first part of the screw profile section are selected to be, in terms of radian measurement, greater than or equal to 0 and smaller than or equal to $\pi(2*z)$. In the present example the angles of the 2 additional arcs are $\alpha\_2=0.3812$ and $\alpha\_3=0.1580$.

According to the invention, the dimensionless radii $R\_2, \ldots, R\_(p-1)$ of the 2 additional arcs of the first part of the screw profile section are selected to be greater than or equal to 0 and smaller than or equal to the dimensionless centre distance A. In the present example the dimensionless radii of the 2 additional arcs are $R\_2=0.1385$ and $R\_3=0.5800$. According to the configuration rules the arcs are arranged so that they merge into each other tangentially in such a manner that a closed, convex screw profile is obtained, an arc with a dimensionless radius of 0 being treated in the same manner as an arc with a dimensionless radius of eps, which is a very small positive real number which tends towards 0 (eps<<1, eps→0). This configuration rule means that the end point of an arc is at the same time the starting point of the next arc. The required tangential transition between a first arc and a second successive arc is obtained by the centre point of the second successive arc being placed in such a manner on a straight line from the end point to the centre point of the first arc that the distance between the centre point of the second successive arc and the end point of the first arc is equal to the radius of the second successive arc and the screw profile is convex. An arc with a radius of 0 is treated in the same way as an arc with a very small radius eps, which tends towards 0, so as to allow the tangential transition pattern to be constructed. Alternatively, an arc with a radius of 0 can be treated in such a manner that the screw profile has a kink at the position of this arc, the size of the kink being determined by the angle of this arc. In the present example the abovementioned configuration rule results in the following positions of the centre points of the two additional arcs: $Mx\_2=0.3039$, $My\_2=0.3202$ and $Mx\_3=0.0000$, $My\_3=0.0000$. Arc 3 is positioned on the dimensionless outer screw radius RA and the configuration rule that at least one arc touches the dimensionless outer screw radius RA is thereby fulfilled.

According to the invention, angle $\alpha\_4$ of the last arc of the first part of the screw profile section is such that the sum of the angles of the 4 arcs of the first part of the screw profile section is, in terms of radian measurement, $\pi(2*z)$, wherein angle $\alpha\_4$ is, in terms of radian measurement, greater than or equal to 0 and smaller than or equal to $\pi/(2*z)$. In the present example, the angle of this last arc, $\alpha\_4$, is 0.6013. According to the invention, the dimensionless radius $R\_4$ of the last arc of the first part of the screw profile section is such that the end point of this last arc touches a straight line FP at one point, this straight line FP being vertically on the angle bisector of the two section boundaries of this section and at such a distance from the point of rotation of the screw profile in the direction of this section which is equal to half the centre distance, the angle bisector like the section boundaries passing through the point of rotation of the screw profile. In FIG. 4*a*, straight line FP is shown in the form of a dotted line. Arc 4 of the first part of the screw profile section is constructed in such a manner that a tangent is placed on arc 3 at the end point of arc 3, the point of intersection between the tangent and the straight line FP is the centre point of a circle whose radius is equal to the length of the distance between the end point of arc 3 and the point of intersection between the tangent and the straight line FP, and the point of intersection in the direction of the selected clock direction between the circle and the straight line FP is the required point of contact between the end point of arc 4 and straight line FP. At the end point of arc 4 a perpendicular to the straight line FP is formed. The point of intersection between this perpendicular and the straight line between the end point and the centre point of arc 3 is the centre point of arc 4. In the present example the position of the centre point of arc 4 is Mx_4=0.2580, My_4=0.3761 and the dimensionless radius of arc 4, R_4, is 0.1239.

Angles $\alpha\_p', \ldots, \alpha\_1'$ of the second part of the screw profile section are defined in such a manner that angle $\alpha\_j'$ of the j'th arc of the second part of the section is the same as angle $\alpha\_j$ of the jth arc of the first part of the section, wherein j and j' are integers which together represent all values in the range from 1 to the number of arcs p and p' respectively ($\alpha\_1'=\alpha\_1, \ldots, \alpha\_p'=\alpha\_p$). In the present example the angles of the second part of the section are $\alpha\_1'=\alpha\_1=0.4304$, $\alpha\_2'=\alpha\_2=0.3812$, $\alpha\_3'=\alpha\_3=0.1580$ and $\alpha\_4'=\alpha\_4=0.6013$.

The dimensionless radii $R\_p', \ldots, R\_1'$ of the second part of the screw profile section are defined by the fact that the sum of the dimensionless radius $R\_j'$ of the j'th arc of the second part of a section and the dimensionless radius $R\_j$ of the jth arc of the first part of a section is equal to the dimensionless centre distance A, wherein j and j' are integers which together represent all values in the range from 1 to the number of arcs p and p' respectively ($R\_1'+R\_1=A=1, \ldots, R\_p'+R\_p=A=1$). In the present example the dimensionless radii of the second part of the section are $R\_1'=A-R\_1=0.0939$, $R\_2'=A-R\_2=0.8615$, $R\_3'=A-R\_3=0.4200$ and $R\_4'=A-R\_4=0.8761$.

According to the invention, the position of the arcs of the second part of the screw profile section is such that the arcs merge tangentially into each other and the screw profile is convex. In the present example the following coordinates apply to the centre points of the 4 arcs of the second part of the screw profile section: Mx_1'=−0.3937, My_1=0.0000, Mx_2'=0.3039, My_2'=−0.3202, Mx_3'=0.0000, My_3'=0.0000 and Mx_4'=0.2580, My_4'=−0.3761. Arc 3 of the second part of the screw profile section is positioned on the dimensionless inner radius RI and the configuration rule that at least one arc touches the dimensionless inner radius RI is thereby fulfilled.

FIGS. 1 to 4 show screw profiles of screw elements with a linear seal of the intermeshing zone. As can be seen from the figures, the length of the linear seal can be set by the selection of the parameters of the arcs. Furthermore, it is possible to design the transition between the tip and flank regions and/or between the sealing region and the transition region with or without a kink in the screw profile.

In the following figures, screw profiles will be described of screw elements with a punctiform seal of the intermeshing zone. It is also possible here to design the transition between the tip and flank regions and/or between the sealing region and the transition region with or without a kink in the screw profile.

FIG. 5: FIG. 5 shows half of a preferred screw profile of a screw element according to the invention consisting of 6 arcs. In FIG. 5 the dimensionless outer screw radius RA is 0.58. In FIG. 5 the dimensionless flight depth H is 0.16. The additional geometrical parameters, which precisely define the screw profile, can be seen from the figures. The screw profile is identical to that shown in FIG. 25. The radius of the arc 3' is equal to 0. The arc 3' lies on the outer screw radius RA and forms the tip region of the sealing region. There is a punctiform seal of the intermeshing zone, the screw profile having a kink at the point of the seal. The channel region is characterized in that the radius of the arc 2 is equal to 0. The screw profile therefore has a kink at this point. In FIG. 5, the minimum dimensionless spacing of the flank region of the channel region from the outer screw radius RA, at 0.1001, is greater than half the dimensionless flight depth H/2=0.08.

FIG. 6: FIGS. 6a to 6b each depict half of a preferred screw profile of a screw element according to the invention consisting of 6 arcs. The dimensionless outer screw radius RA is 0.58. In FIGS. 6a and 6b, the dimensionless flight depth H is in each case 0.16. The further geometrical variables which describe the screw profiles exactly can be gathered from the figures. The radius of the arc 3' is equal to 0.25 in both figures. It is characteristic for the screw profiles in FIGS. 6a and 6b that the arc 3' forms a tangent to the screw radius RA at a point. The tangent point forms the tip region of the sealing region. There is a punctiform seal of the intermeshing zone, the screw profile not having a kink at the point of the seal. The tangent point divides the arc 3' into two parts. One part belongs with the arcs 1' and 2' to the sealing region. The other part belongs with a part of the arc 3 to the transition region. The channel region is characterized in that the radius of the arc 2 is equal to 0. The screw profile therefore has a kink at this point. In FIGS. 6a and 6b, the minimum dimensionless spacing of the flank region of the channel region from the outer screw radius RA, at 0.1448 and 0.1166, is greater than half the dimensionless flight depth H/2=0.08.

Figure 7:
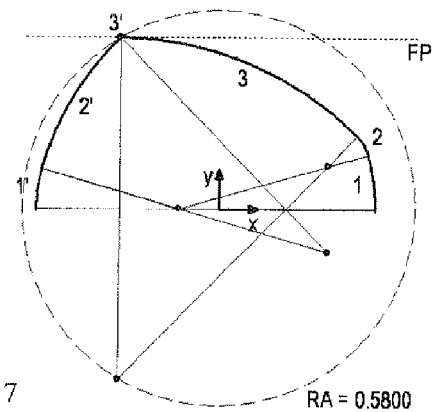

FIG. 7: FIG. 7 shows half of a preferred screw profile of a screw element according to the invention consisting of 6 arcs. The dimensionless outer screw radius RA is 0.58. In FIG. 7, the dimensionless flight depth H is 0.16. The further geometrical variables which describe the screw profile exactly can be gathered from the figure. As in FIG. 5, the sealing of the intermeshing zone takes place via the arc 3'. In comparison with FIG. 5, the channel region in FIG. 7 is characterized in that the radius of the arc 2 is greater than 0. The screw profile therefore does not have a kink at this point. In FIG. 7, the minimum dimensionless spacing of the flank region of the channel region from the outer screw radius RA, at 0.1194, is greater than half the dimensionless flight depth H/2=0.08.

Figure 8A:
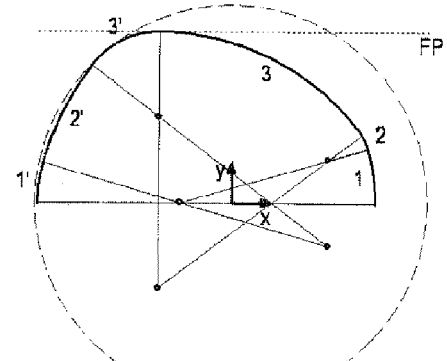
Figure 8B:
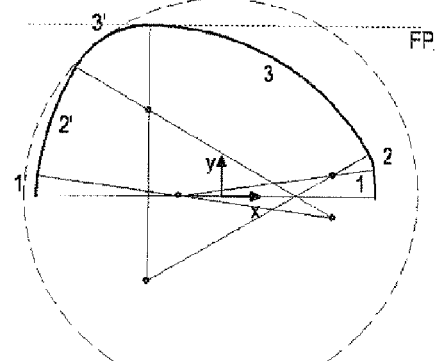

FIG. 8: FIGS. 8a to 8b each show half of a preferred screw profile of a screw element according to the invention consisting of 6 arcs. The dimensionless outer screw radius RA is 0.58. In FIGS. 8a and 8b, the dimensionless flight depth H is in each case 0.16. The further geometrical variables which describe the screw profiles exactly can be gathered from the figures. As in FIG. 6, the sealing of the intermeshing zone takes place via the arc 3' which forms a tangent to the outer screw radius RA at a point. In comparison with FIG. 6, the channel region in FIG. 8 is characterized in that the radius of the arc 2 is greater than 0. The screw profile therefore does not have a kink at this point. In FIGS. 8a and 8b, the minimum dimensionless spacing of the flank region of the channel region from the outer screw radius RA, at 0.1531 and 0.1252, is greater than half the dimensionless flight depth H/2=0.08.

Figure 9:
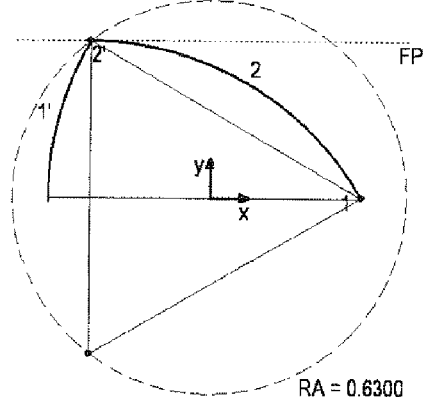

FIG. 9: FIG. 9 shows half of a preferred screw profile of a screw element according to the invention consisting of 4 arcs. The dimensionless outer screw radius RA is 0.63. In FIG. 9, the dimensionless flight depth H is 0.26. The further geometrical variables which describe the screw profile exactly can be gathered from the figure. The radius of the arc 2' is equal to 0. The arc 2' lies on the outer screw radius RA and forms the tip region of the sealing region. There is a punctiform seal of the intermeshing zone, the screw profile having a kink at the point of the seal. The channel region is characterized in that the radius of the arc 1 is equal to 0. The screw profile therefore has a kink at this point. In FIG. 9, the minimum dimensionless spacing of the flank region of the channel region from the outer screw radius RA, at 0.1473, is greater than half the dimensionless flight depth H/2=0.13.

Figure 10A:
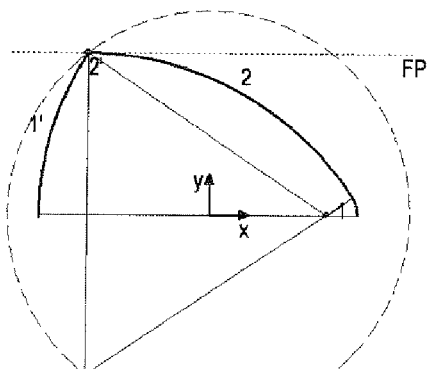
Figure 10B:
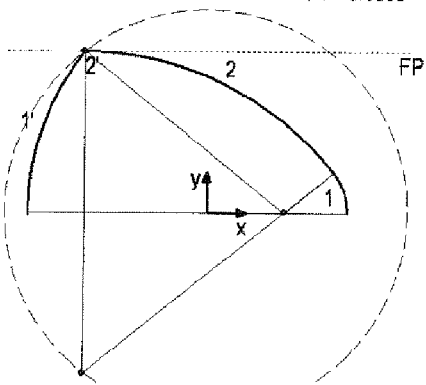

FIG. 10: FIGS. 10a and 10b each show half of a preferred screw profile of a screw element according to the invention consisting of 4 arcs. The dimensionless outer screw radius RA is 0.63. In FIGS. 10a and 10b, the dimensionless flight depth H is in each case 0.26. The further geometrical variables which describe the screw profiles exactly can be gathered from the figures. As in FIG. 9, the sealing of the intermeshing zone takes place via the arc 2'. In comparison with FIG. 9, the channel region in FIG. 10 is characterized in that the radius of the arc 1 is greater than 0. The screw profile therefore does not have a kink at this point. In FIGS. 10a and 10b, the minimum dimensionless spacing of the flank region of the channel region from the outer screw radius RA, at 0.1650 and 0.1888, is greater than half the dimensionless flight depth H/2=0.13.

Figure 11A:
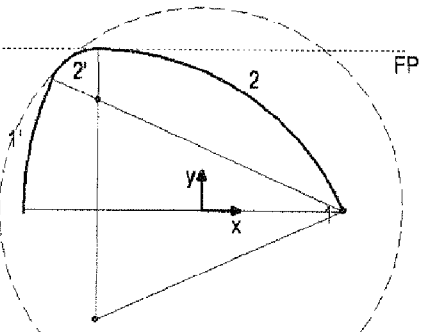
Figure 11B:
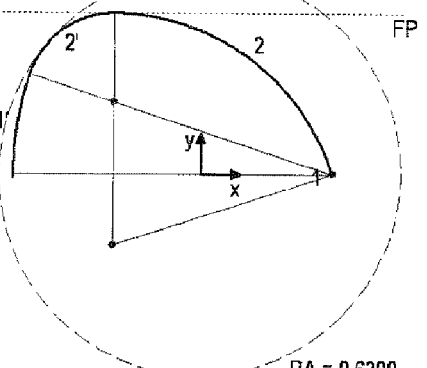

FIG. 11: FIGS. 11a and 11b each depict half of a preferred screw profile of a screw element according to the invention consisting of 4 arcs. The dimensionless outer screw radius RA is 0.63. In FIGS. 11a and 11b, the dimensionless flight depth H is in each case 0.26. The further geometrical variables which describe the screw profiles exactly can be gathered from the figures. In FIGS. 11a and 11b, the radius of the arc 2' is equal to 0.1572 and 0.2764. It is characteristic for the screw profiles in FIGS. 11a and 11b that the arc 2' forms a tangent to the screw radius RA at a point. The tangent point forms the tip region of the sealing region. There is a punctiform seal of the intermeshing zone, the screw profile not having a kink at the point of the seal. The tangent point divides the arc 2' into two parts. One part belongs with the arc 1' to the sealing region. The other part belongs with a part of the arc 2 to the transition region. The channel region is characterized in that the radius of the arc 1 is equal to 0. The screw profile therefore has a kink at this point. In FIGS. 11a and 11b, the minimum dimensionless spacing of the flank region of the channel region from the outer screw radius RA, at 0.1857 and 0.2158, is greater than half the dimensionless flight depth H/2=0.13.

Figure 12A:
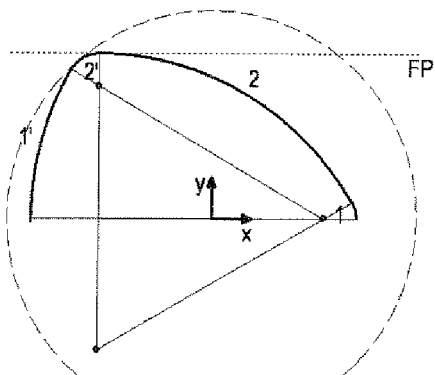
Figure 12B:
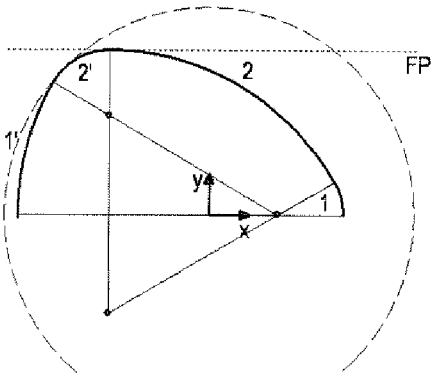

FIG. 12: FIGS. 12a and 12b each show half of a preferred screw profile of a screw element according to the invention consisting of 4 arcs. The dimensionless outer screw radius RA is 0.63. In FIGS. 12a and 12b, the dimensionless flight depth H is in each case 0.26. The further geometrical variables which describe the screw profiles exactly can be gathered from the figures. As in FIG. 11, the sealing of the intermeshing zone takes place via the arc 2' which forms a tangent to the outer screw radius RA at a point. In comparison with FIG. 11, the channel region in FIG. 12 is characterized in that the radius of the arc 1 is greater than 0. The screw profile therefore does not have a kink at this point. In FIGS. 12a and 12b, the minimum dimensionless spacing of the flank region of the channel region from the outer screw radius RA, at 0.1849 and 0.2184, is greater than half the dimensionless flight depth H/2=0.13. The tangent point of the arc 2' to the outer screw radius RA is obtained by calculating the intersection point of a straight line, which runs through the point of origin and the centre point of the arc 2', with said arc 2'. The tangent point of the arc 2 with the screw core radius RI is obtained by calculating the intersection point of a straight line, which runs through the point of origin and the centre point of the arc 2, with said arc 2.

In FIGS. 1 to 4, there is a linear seal of the intermeshing zone. In FIGS. 5 to 12, there is a punctiform seal of the intermeshing zone, the screw profile having a kink in FIGS. 5, 7, 9 and 10 and not having a kink in FIGS. 6, 8, 11 and 12. As a person skilled in the art recognizes, it is therefore possible to use the screw profiles according to the invention to adapt the thermal and mechanical loading of the viscous fluids to be treated in a targeted manner to treating and processing requirements.

FIGS. 1 to 12 show halves of screw profiles of a screw element according to the invention consisting of a maximum of 8 arcs. However, the invention is not restricted in any way to 8 arcs. Rather, as many arcs as desired can be used to generate screw profiles according to the invention.

Figure 13A:
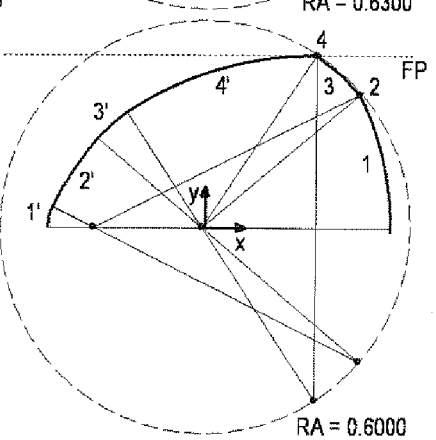
Figure 13B:
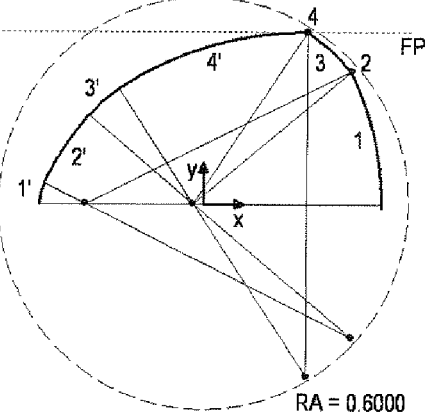
Figure 14A:
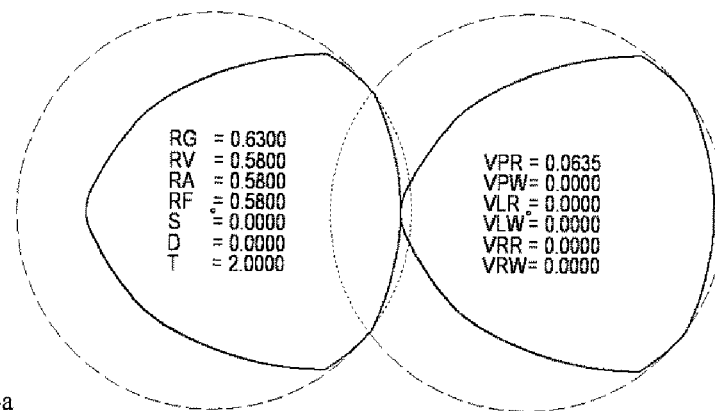
Figure 14B:
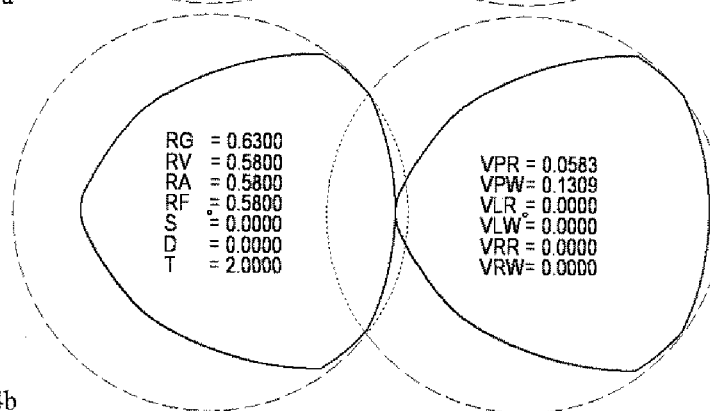
Figure 14C:
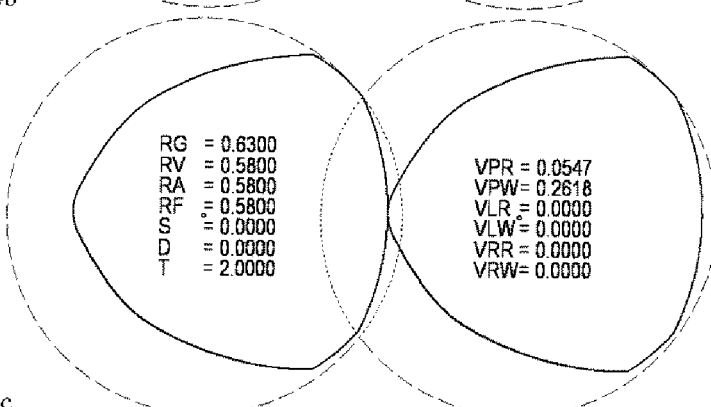
Figure 14D:
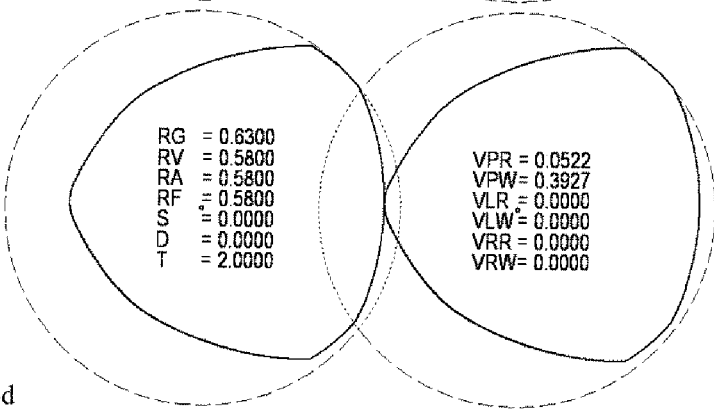
Figure 15A:
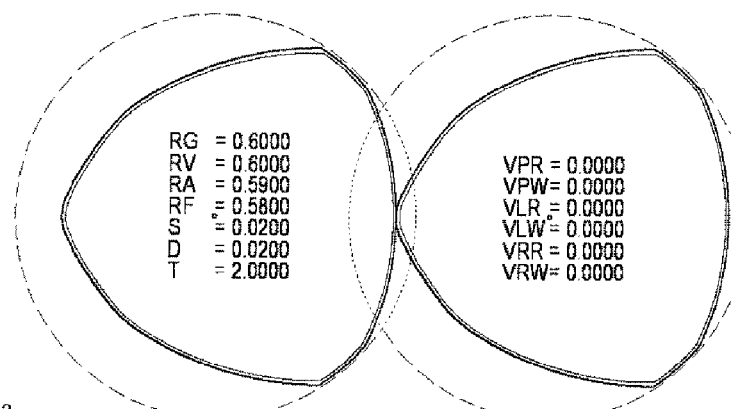
Figure 15B:
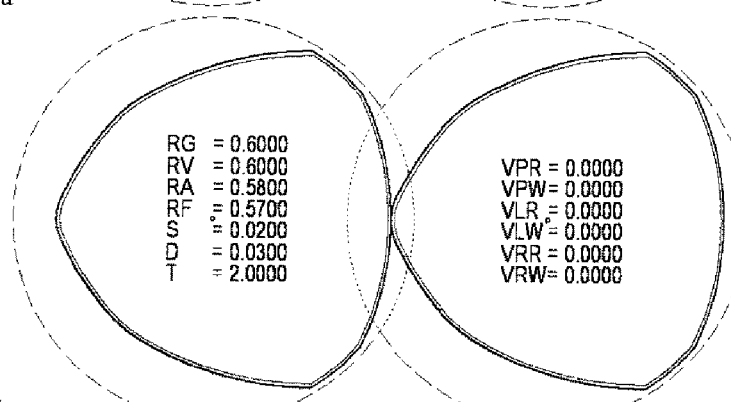
Figure 15C:
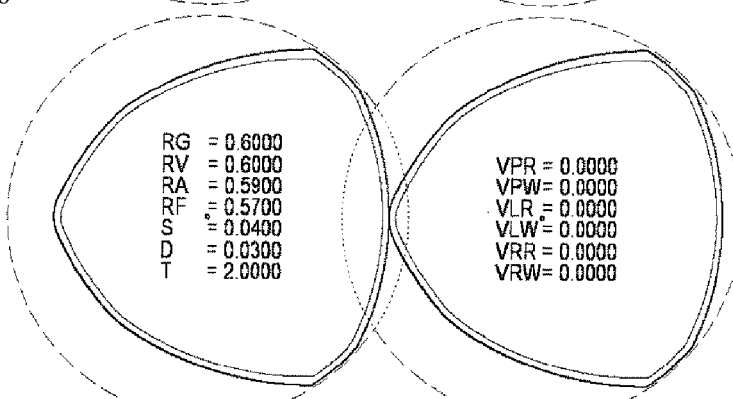
Figure 15D:
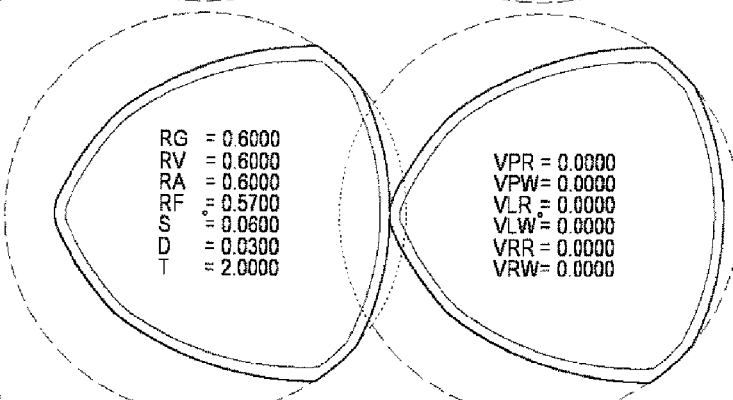
Figure 16A:
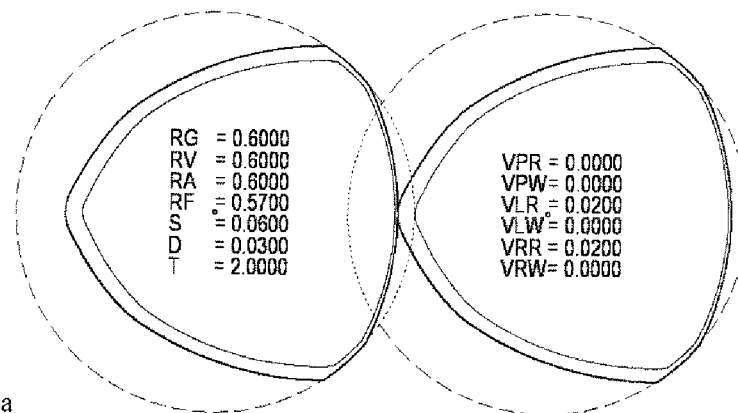
Figure 16B:
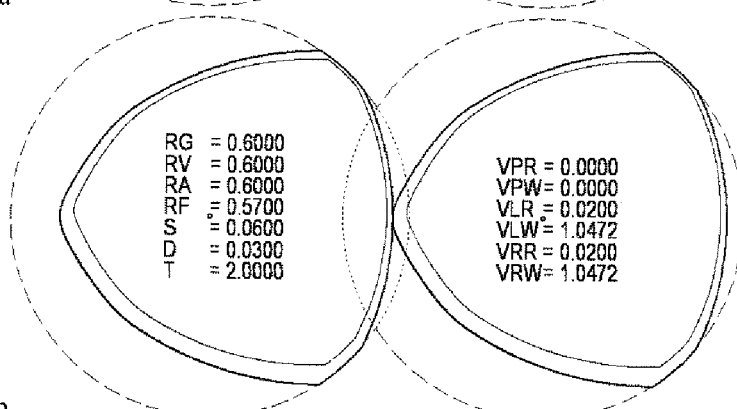
Figure 16C:
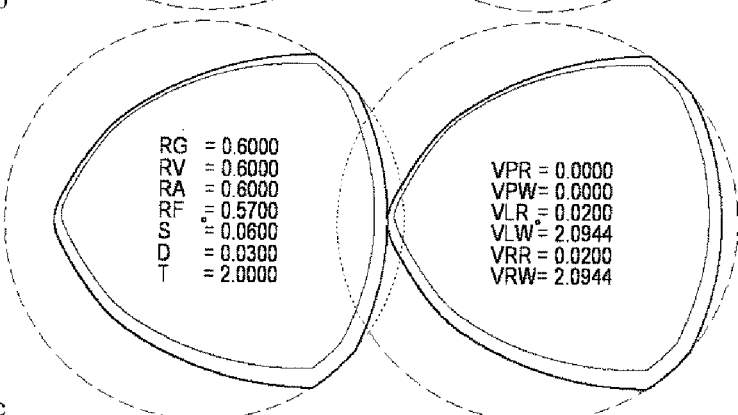
Figure 16D:
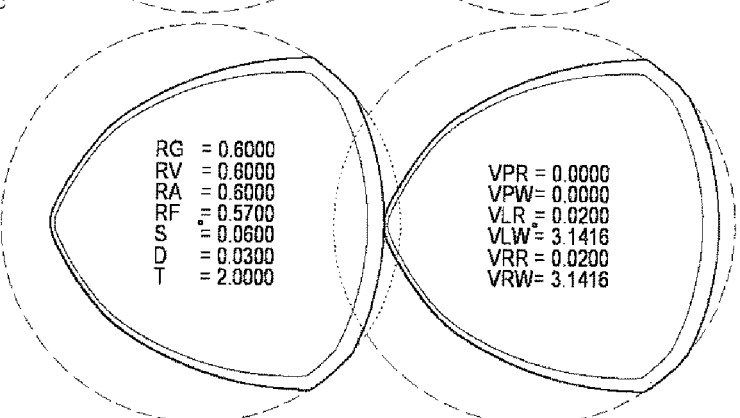

FIG. 13: All one-flight screw profiles can be shifted to a certain extent along the x-axis in a positive or negative x-direction without losing their self-cleaning effect, since by shifting the profiles along the x-axis the condition of touching straight line FP at one point continues to apply. FIG. 13 shows shifts of this type. FIGS. 13a to 13b in each case show half of a preferred screw profile of a screw element according to the invention which is constructed from in each case 8 arcs. The dimensionless outer screw radius RA of the unshifted screw profile is 0.6. In FIGS. 13a and 13b, the dimensionless flight depth H of the unshifted screw profile is in each case 0.2. The further geometrical variables which describe the screw profiles exactly can be gathered from the figures. In FIGS. 13a and 13b, the entire screw profile is shifted to the left by a distance of 0.01 times and 0.03 times the axial spacing respectively. One can see that the radii and angles of the individual arcs are not changed by the shifting. The degree of linear sealing of the intermeshing zone can be set by way of this by the arc 3. In general, the degree of linear or punctiform sealing of the intermeshing zone can be set by the shift of the screw profile of a screw element according to the invention. As a result, in particular, the mechanical and thermal loading of the viscous fluid can be set in the region of the seal in a targeted manner. A screw profile of a screw element according to the invention is preferably shifted by a distance of from 0 times to 0.05 times the axial spacing, particularly preferably by a distance of from 0 times to 0.025 times the axial spacing.

In a second step, a screw profile which is shifted in the x-direction can be shifted in the positive or negative y-direction, without the self-cleaning action of the screw profiles being lost as a result. Asymmetrical sealing of the intermeshing zone occurs as a result. For example, the degree of sealing of the intermeshing zone in the tip regions can be effected as a function of the rotational direction of the screw elements. The maximum spacing of the tip regions of the sealing region of the screw profiles from the barrel preferably lies in the range from 0 times to 0.05 times the axial spacing, particularly preferably in the range from 0 times to 0.025 times the axial spacing.

FIGS. 14 to 16 show the generating and the generated screw profile inside a figure-of-8-shaped screw barrel. Numerical values are provided inside the two screw profiles for the following screw parameters:

RG: the radius of the two barrel bores
  RV: the virtual barrel radius which is smaller than or equal
    to the barrel radius RG
  RA: the outer screw radius of the tightly intermeshing
    self-cleaning screw profiles
  RF: the outer screw radius of the screw profiles to be
    fabricated
  S: the clearance between the two screw profiles to be
    fabricated
  D: the clearance between the screw profiles to be fabricated and the barrel
  T: the pitch of a conveying, mixing or transition element
  VPR: the size of the shift of the planar, tightly intermeshing, self-cleaning screw profiles if the latter are arranged eccentrically VPW: the angle of the shift (directional parameter) of the planar, tightly intermeshing, self-cleaning screw profiles if the latter are arranged eccentrically VLR: the size of the shift within the clearances of the screw profile to be fabricated for the lefthand shaft VLW: the angle of the shift within the clearances of the screw profile to be fabricated for the lefthand shaft, VRR: the size of the shift within the clearances of the screw profile to be fabricated for the righthand shaft VRW: the angle of the shift within the clearances of the screw profile to be fabricated for the righthand shaft.

The screw barrel consisting of two mutually penetrating bores each with a radius RG and a spacing A=1 is depicted by a thin, broken line. In the penetration area of the two barrel bores the two bores are depicted by thin, dotted lines. The centre points of the two barrel bores are identical to the two points of rotation of the screw profiles and are each characterized by a small circle. The tightly intermeshing, self-cleaning screw profiles are characterized by a thick continuous line. The screw profiles being manufactured are depicted by a thin continuous line.

It is known to those skilled in the art that the equation RA=RV-D+S/2 applies to the relationship between the outer screw radius RA of the tightly intermeshing, self-cleaning screw profile, the virtual barrel radius RV, the clearance S between the two screw profiles to be fabricated and the clearance D between the screw profiles to be fabricated and the screw barrel.

It is also known to those skilled in the art that the equation RF=RV−D applies to the relationship between the outer screw radius RF of the screw profile to be fabricated, the virtual barrel radius RV and the clearance D between the screw profiles to be fabricated and the screw barrel.

Typically, the virtual barrel radius RV is equal to the actual barrel radius RG. If the virtual barrel radius RV is selected to be smaller than the barrel radius RG additional clearance exists between the screw profiles and the barrel. This clearance can be used for shifting the generating and the generated screw profile eccentrically while maintaining self-cleaning. This eccentricity is clearly characterized by the size of the shift VPR and the direction of the shift in the form of an angle VPW.

FIG. 14: FIGS. 14a to 14d depict preferred embodiments of an eccentric positioning of the screw profiles of screw elements according to the invention. The geometrical parameters can be found in the individual figures. Eccentrically positioned, one-flight, tightly intermeshing, self-cleaning screw profiles are characterized in that the distance between the screw profiles and the barrel is always identical for the left-hand and right-hand shaft, regardless of the direction of the shift. The screw profiles of FIG. 14a are shifted along the connecting line of the two points of rotation of the screw profiles to such an extent that in each case one point of the tip regions of the sealing region of the screw profiles touches the barrel, so that sealing of the intermeshing zone is achieved. The screw profiles in FIGS. 14b to 14d are in each case shifted to such an extent that only one point of a tip region of the sealing region of the screw profiles touches the barrel. The size of the shift required for this purpose depends on the direction of the shift. It is also possible for the screw profiles to be selected so as to be in eccentric positions in which no point of the tip regions of the sealing region of the screw profiles touches the barrel. In general, the degree of linear or punctiform sealing of the intermeshing zone can be set by the eccentric positioning of the screw profile of a screw element according to the invention. In particular, as a result, the mechanical and thermal loading of the viscous fluid can be set in a targeted manner in the region of the seal. In particular, the degree of sealing of the intermeshing zone in the tip regions can be adapted as a function of the rotational direction of the screw elements. The maximum spacing of the tip regions of the sealing region of the screw profiles from the barrel preferably lies in the range from 0 times to 0.05 times the axial spacing, particularly preferably in the range from 0 times to 0.025 times the axial spacing.

FIG. 15: As is known to those skilled in the art, all screw elements require a certain amount of clearance in practice, not only between each other but also between them and the barrel. FIGS. 15a to 15d depict various clearance strategies. The geometrical parameters can be found in the individual figures. FIG. 15a depicts a clearance strategy in which the clearance between the screw profiles to be fabricated is the same as that between the screw profiles to be fabricated and the barrel. FIG. 15b depicts a clearance strategy in which the clearance between the screw profiles to be fabricated is smaller than that between the screw profiles to be fabricated and the barrel. FIG. 15c depicts a clearance strategy in which the clearance between the screw profiles to be fabricated is greater than the clearance between the screw profiles to be fabricated and the barrel. FIG. 15d depicts a further embodiment according to FIG. 15c with particularly large clearances. Typical clearances occurring in practice for the clearance between the screw profiles to be fabricated are in the range from 0.002 to 0.1. Typical clearances occurring in practice for the clearance between the screw profiles to be fabricated and the barrel are in the range from 0.002 to 0.1. Typical clearances occurring in practice are constant over the periphery of the screw profile. It is however permissible to vary over the periphery of the screw profiles not only the clearance between the screw profiles to be fabricated but also the clearance between the screw profiles to be fabricated and the barrel.

FIG. 16: It is also possible to shift the screw profiles to be fabricated within the clearances. FIGS. 16a to 16d depict a selection of possible shifts. The geometrical parameters can be found in the individual figures. In FIGS. 16a to 16d the size of the shift for both screw profiles to be fabricated is VLR=VRR=0.02. In FIGS. 16a to 16d the direction of the shift of both screw profiles to be fabricated is varied gradually between VLW=VRW=0 and VLW=VRW=π. It is permissible to shift the two screw profiles to be fabricated independently of each other in various directions and by various amounts. This affords those skilled in the art a further possibility of setting the degree of sealing of the intermeshing zone by way of the two tip regions of the sealing region of a screw profile according to the invention. In particular, the mechanical and thermal loading of the viscous fluid in the region of the seal can be set in a targeted manner.

One-flight screw profiles generated by the method of generating tightly intermeshing, self-cleaning, co-rotating screw profiles of flight number z can be used for fabricating screw elements. In particular, such screw profiles can be used for fabricating conveying, mixing, kneading and transition elements.

Figure 17A:
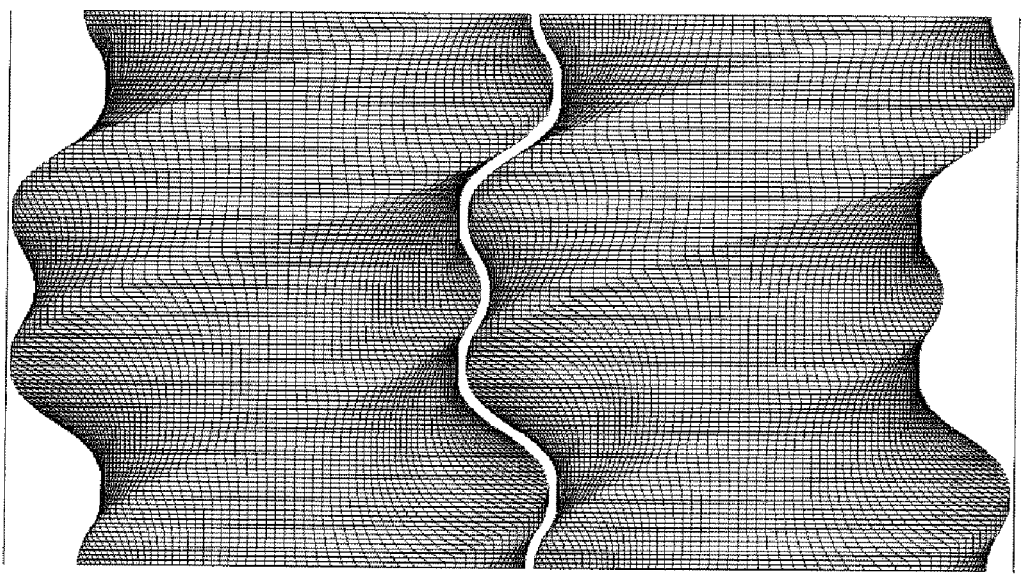

FIG. 17a depicts an example of a pair of one-flight conveying elements according to the invention, the screw profile of which is of a similar design to FIGS. 1 and 2 composed of 8 arcs. The barrel radius RG is 0.6. The clearance S between the two conveying elements is 0.02. The clearance D between the two conveying elements and the barrel is 0.01. The pitch T of the conveying elements is 1.2. The length of the conveying elements is 1.2, which corresponds to a rotation of the screw profiles by an angle $2\pi$. The barrel is depicted by thin, continuous lines on the left and right of the two conveying elements. One possible computational grid which can be used for calculating the flow in twin- and multishaft extruders is also depicted on the surfaces of the two conveying elements.

Figure 17B:
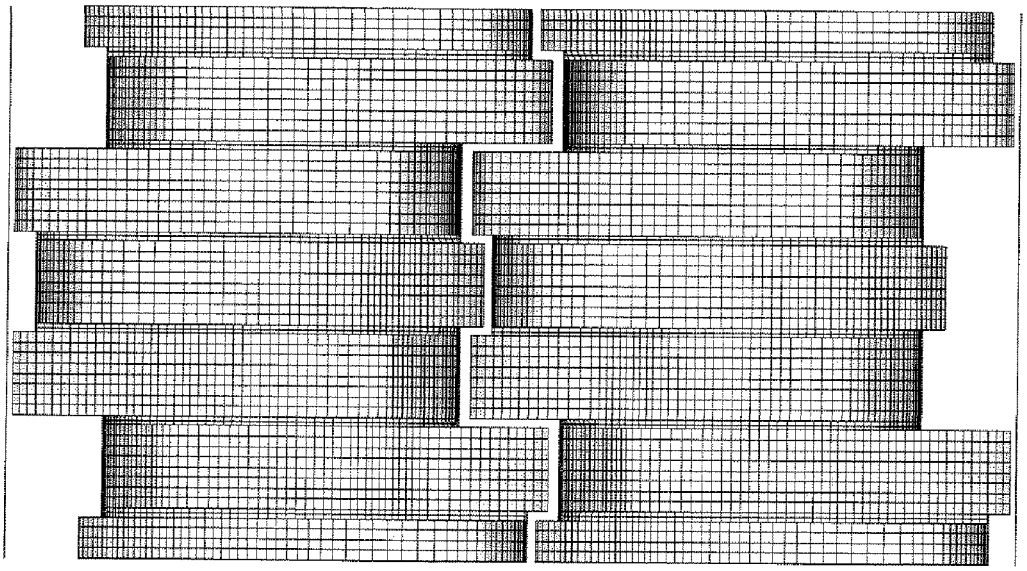
Figure 18A:
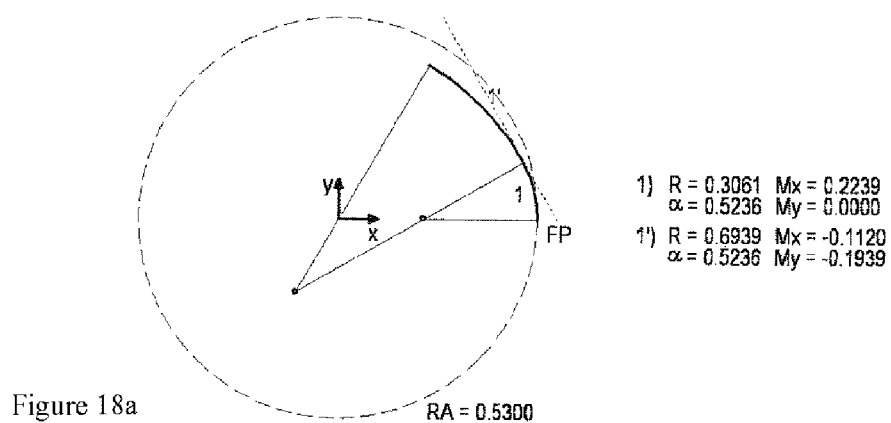
Figure 18B:
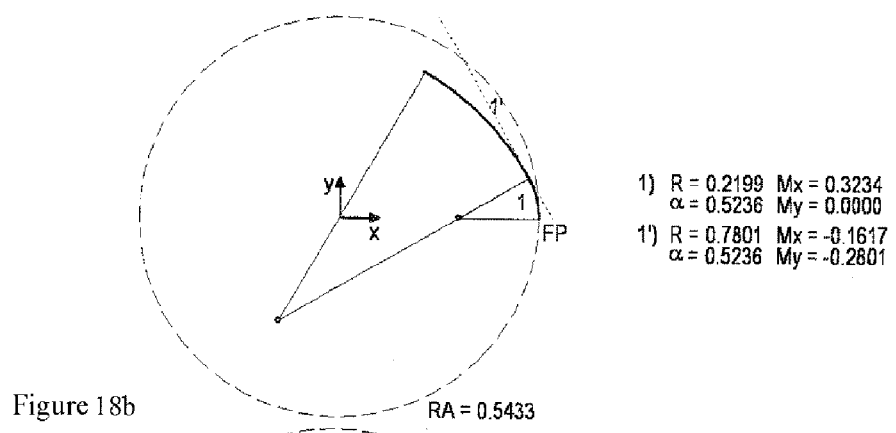
Figure 18C:
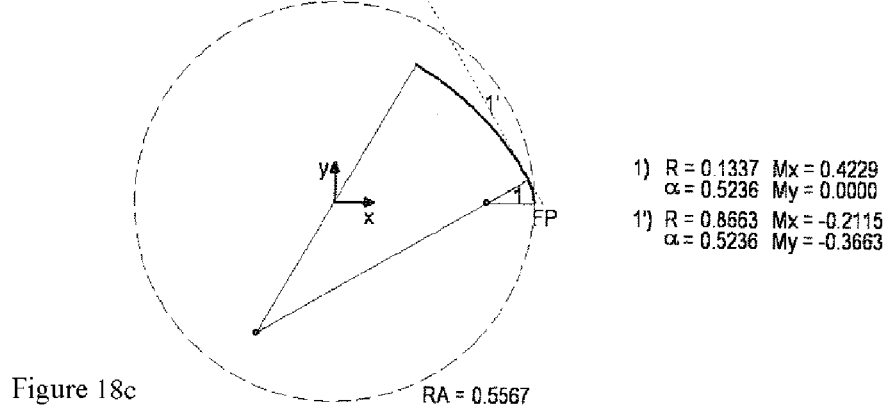
Figure 18D:
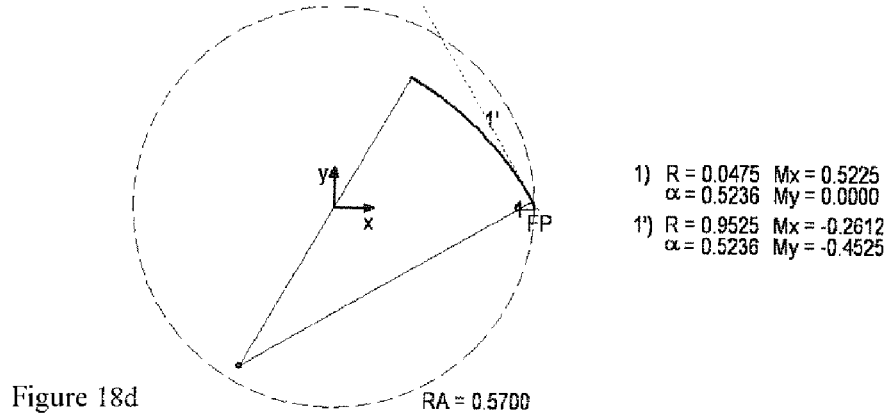

FIG. 17b depicts an example of a pair of one-flight kneading elements according to the invention, the screw profile of which is of a similar design to FIGS. 1 and 2 composed of 8 arcs. The barrel radius RG is 0.6. The clearance S between the kneading discs of the two kneading elements is 0.02. The clearance D between the kneading discs of the two kneading elements and the barrel is 0.01. The kneading element consists of 7 kneading discs each staggered in a righthand manner in relation to each other by an angle $\pi/3$. The first and the last kneading disc have a length of 0.09. The kneading discs in the middle have a length of 0.18. The groove between the kneading discs has a length of 0.02. The barrel is depicted by thin continuous lines on the right and left of the two kneading elements. One possible computational grid which can be used for calculating the flow in twin- and multishaft extruders is also depicted on the surfaces of the two kneading elements.

FIGS. 1 to 17 show screw profiles and screw elements, in which the dimensionless outer screw radius RA has the values 0.55, 0.58, 0.59, 0.6, 0.63 and 0.67. The screw profiles of screw elements according to the invention and the method according to the invention of generating screw profiles according to the invention are not limited to these discrete values of the dimensionless outer screw radius. Using the method according to the invention, single-flight screw profiles can be generated with a dimensionless outer screw radius RA in the range from 0.51 to 0.707, preferably in the range from 0.52 to 0.7.

Surprisingly, three-flight screw profiles which are positioned eccentrically substantially in the direction of a groove region of a three-flight screw profile also lead to a sequence of sealing region—transition region—channel region—transition region and therefore to screw elements according to the invention.

FIGS. 18 to 20 depict centrally positioned screw profiles with 3 flights, which are generated by the method of generating tightly intermeshing, self-cleaning, co-rotating screw profiles of flight number z. FIGS. 18 to 20 in each case depict a sixth of a screw profile with 3 flights.

FIG. 18: FIGS. 18a to 18d depict preferred 2-circle screw profiles of a three-flight screw profile. FIGS. 18a to 18d differ by the outer screw radius RA. In FIGS. 18a to 18d radius R_1 of arc 1 is dependent on the outer screw radius RA. In FIGS. 18a to 18d arc 1 has an angle $\alpha\_1=\pi/6$.

FIG. 19: FIGS. 19a to 19d depict preferred 4-circle screw profiles of a three-flight screw profile. FIGS. 19a to 19d differ by the outer screw radius RA. In FIGS. 19a to 19d arc 1 has the radius R_1=RA. In FIGS. 19a to 19d arc 2 has the radius R_2=0. In FIGS. 19a to 19d angle $\alpha\_1$ of arc 1 is dependent on the outer screw radius RA. In FIGS. 19a to 19d radius $\alpha\_2$ of arc 2 is dependent on the outer screw radius RA.

FIG. 20: FIGS. 20a to 20d depict additional preferred 4-circle screw profiles of a three-flight screw profile. FIGS. 20a to 20d differ by the outer screw radius RA. In FIGS. 20a to 20d arc 1 has the radius R_1=0. In FIGS. 20a to 20d arc 2 has the radius R_2=A=1. In FIGS. 20a to 20d angle $\alpha\_1$ of arc 1 is dependent on the outer screw radius RA. In FIGS. 20a to 20d radius $\alpha\_2$ of arc 2 is dependent on the outer screw radius RA. FIGS. 18 to 20 show a sixth of three-flight screw profiles consisting of a maximum of 4 arcs. However, three-flight screw profiles are not restricted in any way to 4 arcs. Rather, as many arcs as desired can be used for generating three-flight screw profiles.

Figure 21A:
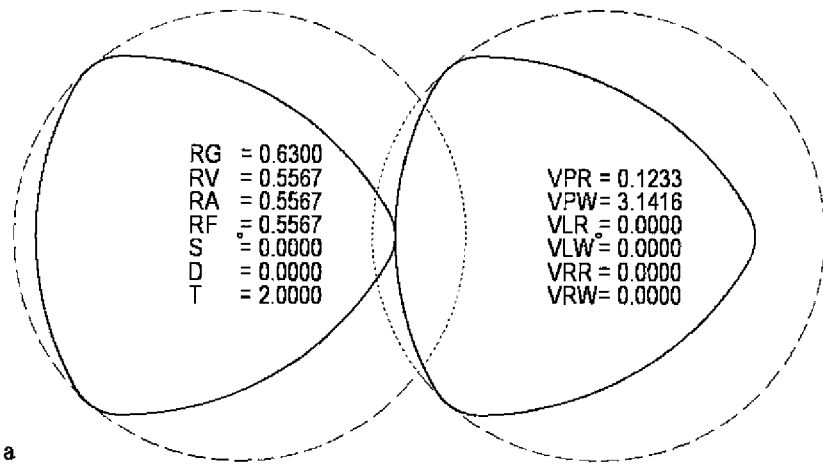
Figure 21B:
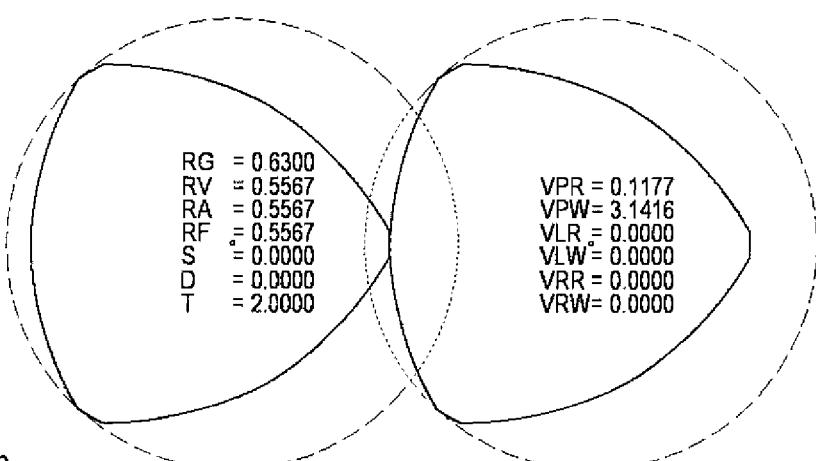
Figure 21C:
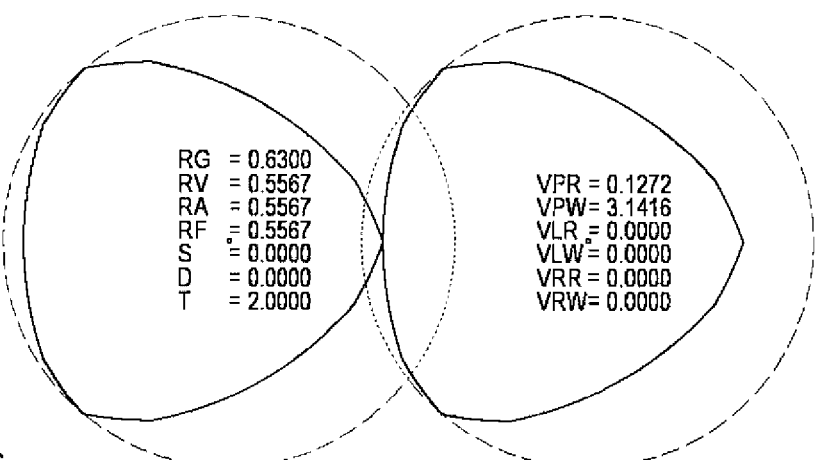

FIG. 21: FIGS. 21a to 21c show preferred embodiments of eccentric positioning of three-flight screw profiles. FIG. 21a shows eccentric positioning of a three-flight screw profile according to FIG. 18c. FIG. 21b shows eccentric positioning of a three-flight screw profile according to FIG. 19c. FIG. 21c shows eccentric positioning of a three-flight screw profile according to FIG. 20c. The virtual barrel radius RV is 0.5567 and is smaller than the barrel radius RG (RG=0.63). The further geometrical characteristic variables can be gathered from the individual figures. Eccentrically positioned, three-flight, sealingly meshing, self-cleaning screw profiles are characterized in that the minimum spacing of the screw profiles from the barrel is equally large for the left-hand and right-hand shafts independently of the direction of the shift. The three-flight screw profiles in FIGS. 21a to 21c are in each case positioned eccentrically in such a way that in each case one point of the tip regions of the sealing region of the screw profiles contacts the barrel, with the result that sealing of the intermeshing zone is achieved. The eccentrically positioned three-flight screw profile leads to a screw profile according to the invention with a sequence of sealing region—transition region—channel region—transition region. The sealing therefore takes place via two of the three tips of a three-flight screw element. The three-flight screw profiles are shifted out of the centrical position in the direction of one of their groove regions. In FIGS. 21a to 21c, the shift took place along the connecting line of the two pivot points of the screw profiles. The magnitude of the shift, by way of which sealing of the intermeshing zone is achieved, depends on the selected screw profile.

Figure 22A:
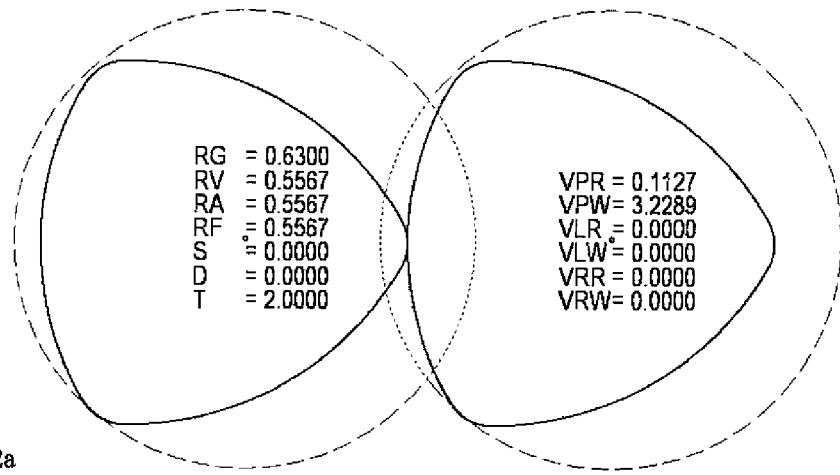
Figure 22B:
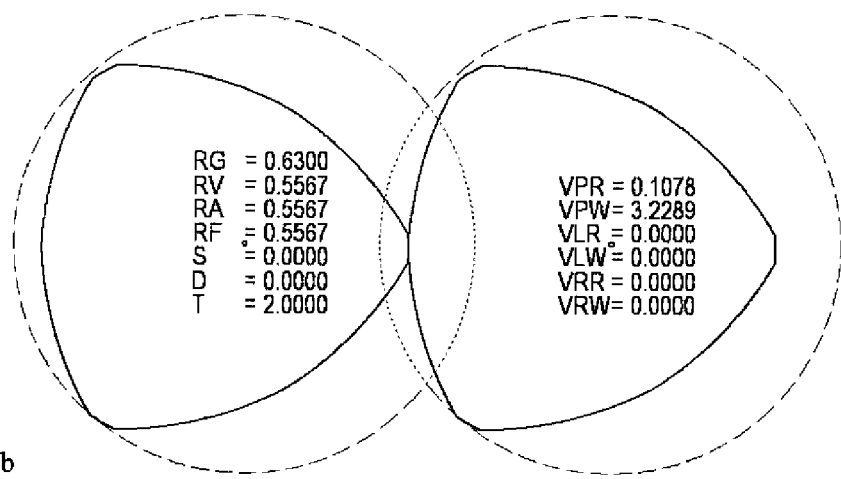
Figure 22C:
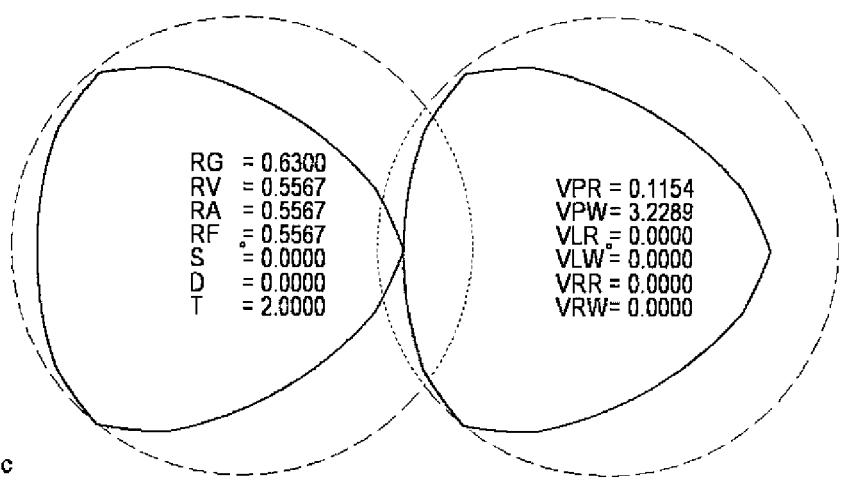

FIG. 22: FIGS. 22a to 22c show further preferred embodiments of eccentric positioning of three-flight screw profiles. FIG. 22a shows eccentric positioning of a three-flight screw profile according to FIG. 18c. FIG. 22b shows eccentric positioning of a three-flight screw profile according to FIG. 19c. FIG. 22c shows eccentric positioning of a three-flight screw profile according to FIG. 20c. The virtual barrel radius RV is 0.5567 and is smaller than the barrel radius RG (RG=0.63). The further geometrical characteristic variables can be gathered from the individual figures. The screw profiles in FIGS. 22a to 22c are in each case positioned eccentrically in such a way that only one point of a tip region of the sealing region of the screw profiles contacts the barrel. The magnitude of the shift necessary for this purpose depends on the direction of the shift.

Furthermore, eccentric positions of the screw profiles can be selected, in which no point of the tip regions of the sealing region of the screw profiles contacts the barrel. In general, the degree of linear or punctiform sealing of the intermeshing zone can be set by the eccentric positioning of the screw profile of a screw element according to the invention. As a result, in particular, the mechanical and thermal loading of the viscous fluid can be set in the region of the seal in a targeted manner. In particular, the degree of sealing of the intermeshing region in the tip regions can be adapted as a function of the rotational direction of the screw elements. The maximum spacing of the tip regions of the sealing region of the screw profiles from the barrel preferably lies in the range from 0 times to 0.05 times the axial spacing, particularly preferably in the range from 0 times to 0.025 times the axial spacing.

As is known to a person skilled in the art, in practice all screw elements need a certain amount of play, to be precise both between one another and with respect to the barrel. The abovementioned play strategies and the abovementioned play magnitudes according to FIG. 15 apply to the eccentrically positioned three-flight screw profiles and the resulting screw elements. Furthermore, it is possible to shift the screw profiles to be produced within the plays. In this regard, the statements according to FIG. 16 apply.

FIGS. 21 to 22 show eccentrically positioned three-flight screw profiles, in which a sixth of the screw profile consists of a maximum of 4 arcs. However, the invention is not restricted to eccentrically positioned three-flight screw profiles, in which a sixth of the screw profile consists of a maximum of 4 arcs. Rather, as many arcs as desired can be used to generate screw profiles according to the invention.

Figure 19A:
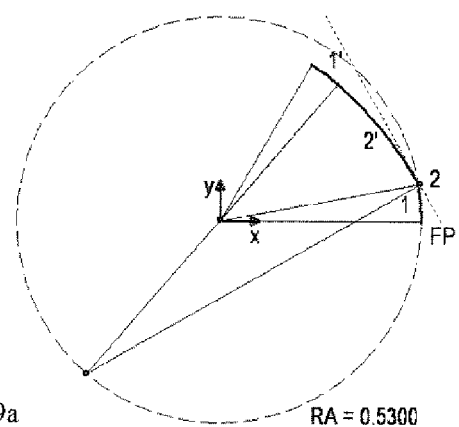
Figure 19B:
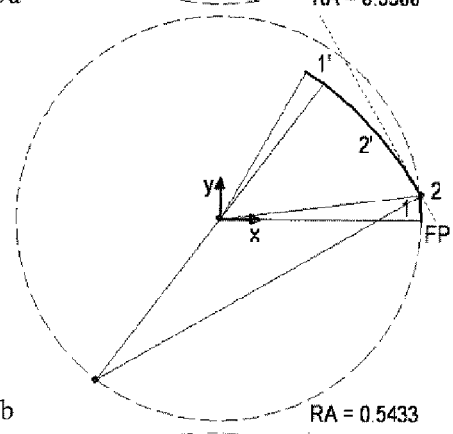
Figure 19C:
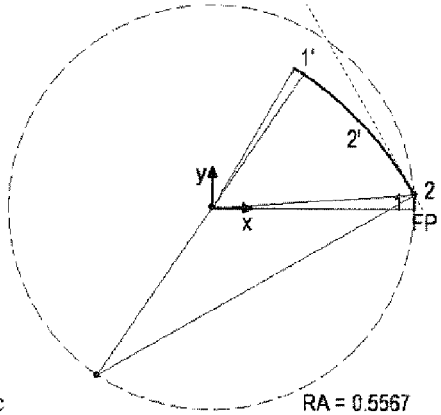
Figure 19D:
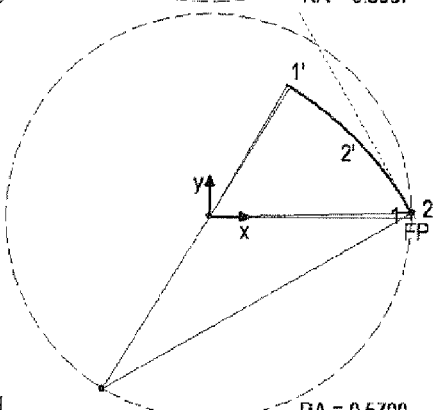
Figure 20A:
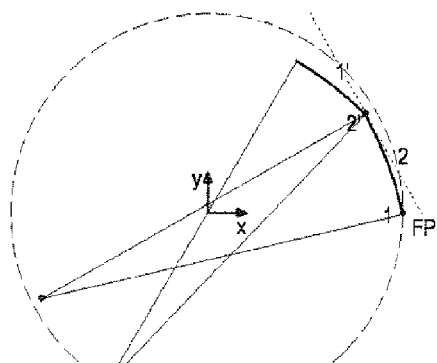
Figure 20B:
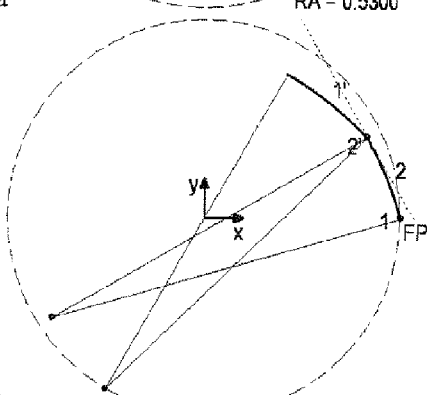
Figure 20C:
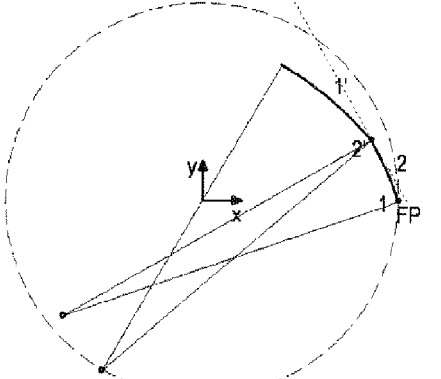
Figure 20D:
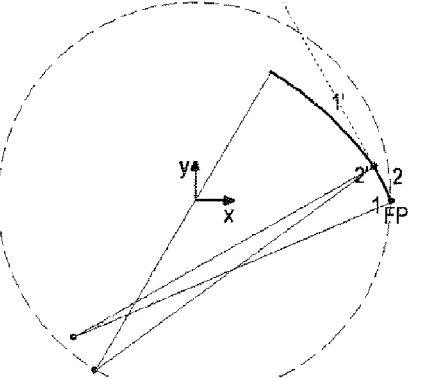
Figure 23A:
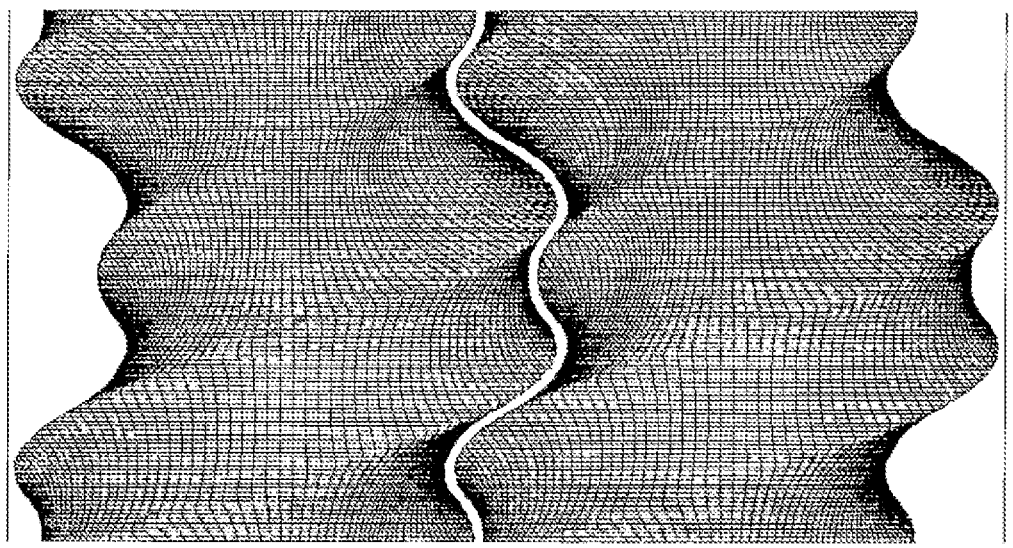

FIG. 23*a* depicts an example of a pair of eccentric three-flight conveying elements, which is based on the screw profile according to FIG. 19*c*. The barrel radius RG is 0.63 and the virtual barrel radius RV is 0.5567. The clearance S between the two conveying elements is 0.02. The clearance D between the two conveying elements and the barrel is 0.01. The pitch of the conveying elements T is 1.2. The length of the conveying elements is 1.2, which corresponds to a rotation of the screw profiles by an angle of $2\pi$. The barrel is depicted by thin, continuous lines on the left and right of the two conveying elements. In addition, one possible computational grid which can be used for calculating the flow in twin- and multishaft extruders is depicted on the surfaces of the two conveying elements.

Figure 23B:
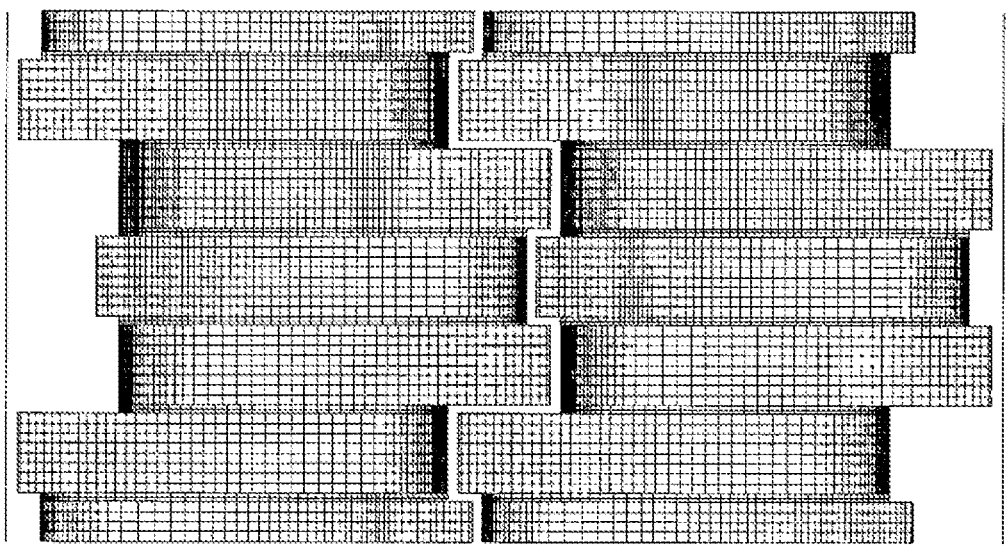

FIG. 23*b* depicts an example of a pair of eccentric three-flight kneading elements, which is based on the screw profile according to FIG. 19*c*. The barrel radius RG is 0.63 and the virtual barrel radius RV is 0.5567. The clearance S between the kneading discs of the two kneading elements is 0.02. The clearance D between the kneading discs of the two kneading elements and the barrel is 0.01. The kneading element consists of 7 kneading discs each staggered in a righthand direction in relation to each other by an angle of $\pi/3$. The first and the last kneading discs have a length of 0.09. The kneading discs in the middle have a length of 0.18. The groove between the kneading discs has a length of 0.02. The barrel is depicted by thin, continuous lines on the left and the right of the two kneading elements. In addition, one possible computational grid which can be used for calculating the flow in twin- and multishaft extruders is depicted on the surfaces of the two kneading elements.

FIGS. 18 to 20 show three-flight screw profiles, in which the dimensionless outer screw radius RA has the values 0.53, 0.5433, 0.5567 and 0.57. Three-flight screw profiles are not limited to these discrete values of the dimensionless outer screw radius. Using the method according to the invention, three-flight screw profiles can be generated with a dimensionless outer screw radius RA in the range from 0.505 to 0.577, preferably in the range from 0.51 to 0.57.

FIGS. 21 to 23 show eccentrically positioned three-flight screw profiles and screw elements, in which the dimensionless barrel radius RG is equal to 0.63 and the virtual barrel radius RV is equal to 0.5567. The eccentrically positioned three-flight screw profiles of screw elements according to the invention and the method according to the invention of generating screw profiles according to the invention are not limited to this discrete value of the barrel radius and the virtual barrel radius. Using the method according to the invention, eccentrically positioned three-flight screw profiles can be positioned in a barrel with a radius RG in the range from 0.51 to 0.707, preferably in the range from 0.52 to 0.7, the virtual barrel radius lying with a radius RV in the range from 0.505 to 0.577, preferably in the range from 0.51 to 0.57.

FIGS. 24*a* to 24*f* depict the transition from a pair of two-flight screw profiles to a pair of one-flight screw profiles. All of these figures have the same structure, which is described in detail in the following. The generating screw profile is depicted by the screw profile on the left. The generated screw profile is depicted by the screw profile on the right. Both screw profiles consist of 16 arcs. The arcs of the generating and the generated screw profile are characterized by thick, continuous lines labeled with the respective numbers of the arcs. Due to the plurality of arcs and the generation of the figures by means of a computer program it is possible for the numbers of individual arcs to overlap each other and therefore to be difficult to read—see, for example, arcs 3', 4' and arcs 5', 6' and 7' in FIG. 24*a*. Despite the somewhat poor legibility of individual numbers, the structure of the profiles is still clear from the Appendix in combination with the present description. The centre points of the arcs are depicted by small circles. The centre point of each arc is connected by thin continuous lines to its starting and end points. The outer screw radius is almost identical in size both for the generating and the generated screw profile. In the region of the screw barrel, the outer screw radius is characterized by a thin, broken line, and, in the intermeshing zone, by a thin dotted line.

Figure 24A:
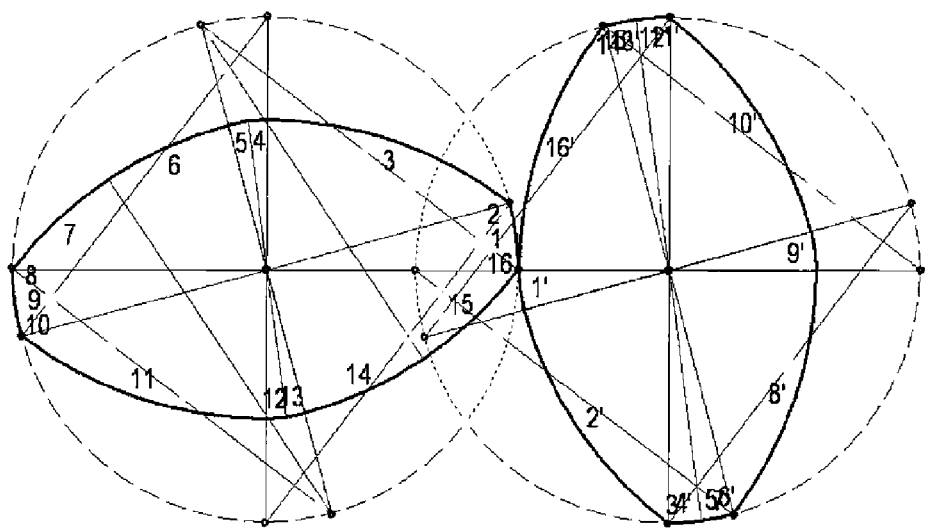

FIG. 24*a* depicts a pair of two-flight screw profiles at the start of the transition section. The generating screw profile and the generated screw profile are symmetrical to each other. Arcs 1 and 9 of the generating screw profile touch the outer screw radius over their entire length. Arcs 4, 5 and 12, 13 of the generating screw profile touch the inner radius over their entire length. Arcs 4', 5' and 12', 13' of the generated screw profile touch the outer screw radius over their entire length. Arcs 1' and 9' of the generated screw profile touch the inner radius over their entire length.

Figure 24B:
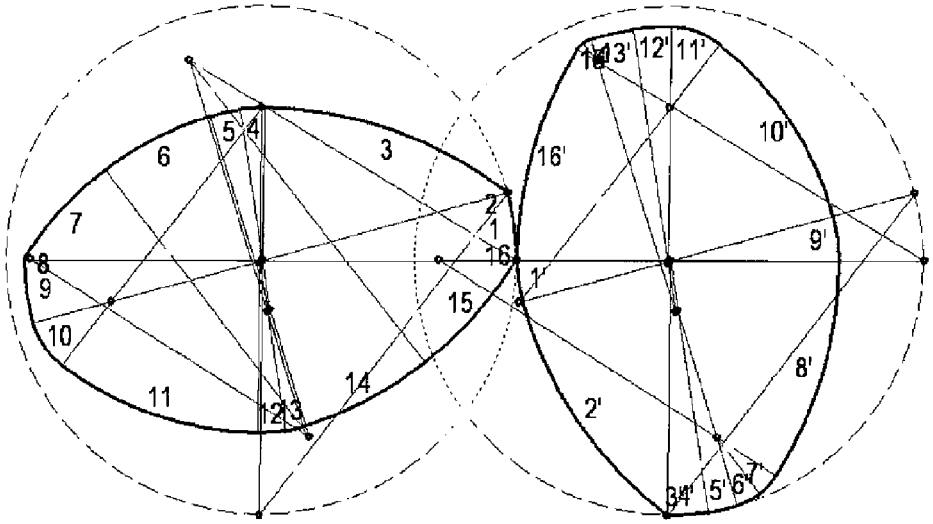
Figure 24C:
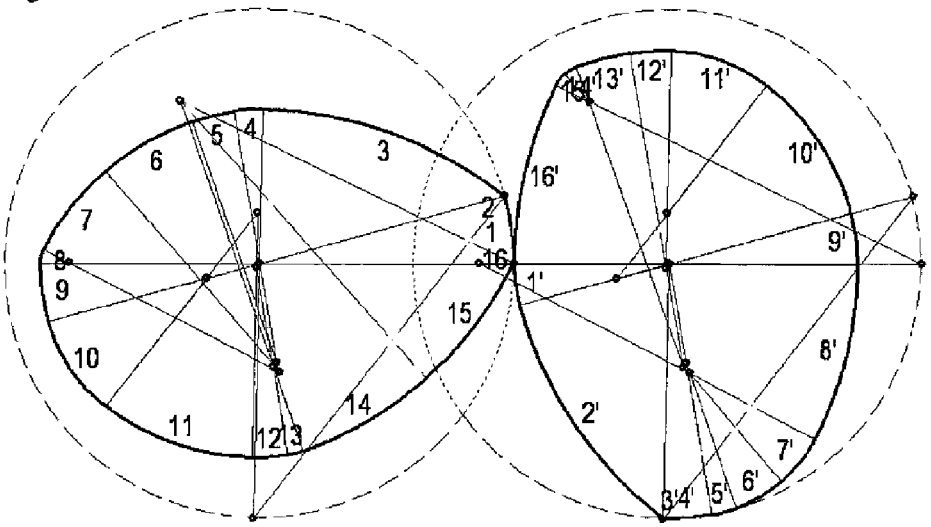
Figure 24D:
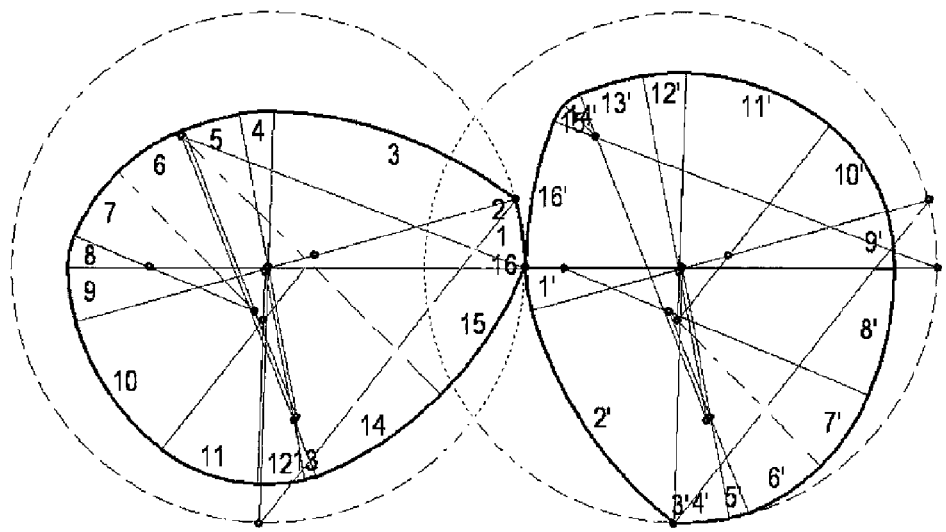
Figure 24E:
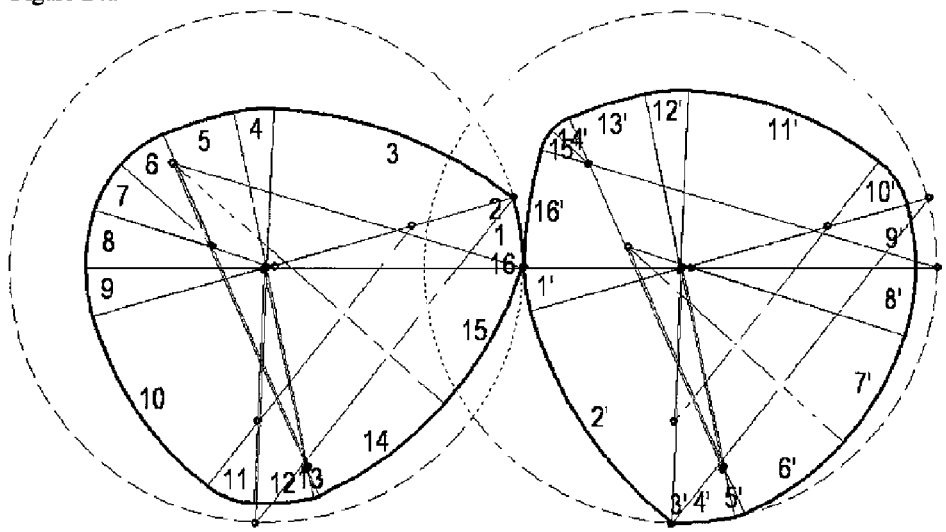
Figure 24F:
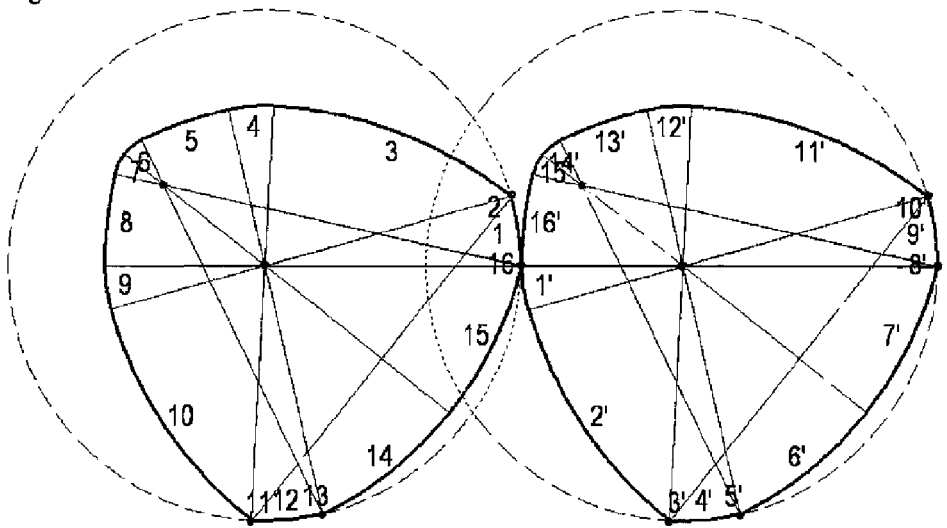

FIG. 24*f* depicts a pair of one-flight screw profiles at the end of the transition section. The generating and the generated screw profile are symmetrical to each other. Arcs 1 and 12 of the generating screw profile touch the outer screw radius over their entire length. Arcs 4 and 9 of the generating screw profile touch the inner radius over their entire length. Arcs 4' and 9' of the generated screw profile touch the outer screw radius over their entire length. Arcs 1' and 12' of the generated screw profile touch the inner radius over their entire length.

FIG. 24*b* shows a pair of transition profiles in which the transition from the two-flight screw profiles to the one-flight screw profiles has been completed to an extent of 20%. FIG. 24*c* shows a pair of transition profiles in which the transition has been completed to an extent of 40%. FIG. 24*d* shows a pair of transition profiles in which the transition has been completed to an extent of 60%. FIG. 24*e* shows a pair of transition profiles in which the transition has been completed to an extent of 80%.

The transition takes place in such a manner that in all cases arc 1 of the generating screw profile touches the dimensionless outer screw radius RA over its entire length, as a result of which the corresponding arc 1' of the generated screw profile touches the dimensionless inner radius RI' over its entire length. The transition takes place in such a manner that in all cases arc 4' of the generated screw profile touches the dimensionless outer screw radius RA', as a result of which the corresponding arc 4 of the generating screw profile touches the dimensionless inner radius RI. Since in all cases one arc of the generating and one arc of the generated screw profile rests on or touches the outer screw radius the wiping of the inner barrel surface is guaranteed during the entire transition. In addition, it is clear from FIGS. 24b to 24e that the generating and the generated screw profiles are asymmetrical. A pair of transition elements consists in all cases of a first transition element which is based on the generating transition profiles and a second transition element which is based on the generated transition profiles.

FIG. 24 shows transition profiles in which the dimensionless outer screw radius of the generating screw profile and the dimensionless outer screw radius of the generated screw profile are in the range from RA=RA'=0.6146 to RA=RA'=0.6288. The method according to the invention for generating planar, tightly intermeshing, self-cleaning, co-rotating screw profiles is not limited to this range of the dimensionless outer screw radius. Using the method according to the invention, screw profiles with a dimensionless outer screw radius RA of the generating screw profile of between RA=greater than 0 and RA=smaller than or equal to 1, and preferably in the range from RA=0.52 to RA=0.707, can be generated. Using the method according to the invention, screw profiles with a dimensionless outer screw radius RA' of the generated screw profile of between RA'=greater than 0 and RA'=smaller than or equal to 1, and preferably in the range from RA'=0.52 to RA'=0.707, can be generated.

The method according to the invention for generating planar, tightly intermeshing, self-cleaning and co-rotating screw profiles is explained in the following using the example of the pair of screw profiles in FIG. 24d.

According to the invention, the generating and generated screw profiles lie in one plane. For the sake of simplicity this plane is placed in the xy plane of a Cartesian coordinate system. Also for the sake of simplicity the point of rotation of the generating screw profile is placed at the origin of the Cartesian coordinate system (x=0, y=0). The dimensionless centre distance between the two points of rotation of the generating and the generated screw profile A is 1. For the sake of simplicity the point of rotation of the generated screw profile is placed at coordinate x=A=1, y=0.

According to the invention the number of arcs n of the generating screw profile is selected such that n is greater than or equal to 1. In the present example the number of arcs n is selected to be 16. According to the invention, the dimensionless outer screw radius RA of the generating screw profile is selected in such a manner that it is greater than 0 and smaller than or equal to the dimensionless centre distance A. In the present example the dimensionless outer screw radius RA of the generating screw profile is selected to be 0.6203. According to the invention, the dimensionless inner radius RI of the generating screw profile is selected to be greater than or equal to 0 and smaller than or equal to the dimensionless outer screw radius RA. In the present example the dimensionless inner radius RI of the generating screw profile is selected to be 0.3798.

The arcs of the generating screw profile can be arranged in a clockwise or anticlockwise direction around the axis of rotation of the generating screw profile. In the present example the arcs are arranged anti-clockwise around the axis of rotation of the generating screw profile.

According to the invention, angle $\alpha\_1$ of arc 1 of the generating screw profile is selected to be, in terms of radian measurement, greater than or equal to 0 and smaller than or equal to $2\pi$. In the present example the angle of arc 1, $\alpha\_1$, is selected to be 0.2744. According to the invention, the dimensionless radius R_1 of arc 1 of the generating screw profile is selected to be greater than or equal to 0 and smaller than or equal to the dimensionless centre distance A. In the present example the dimensionless radius of arc 1, R_1, is RA=0.6203. According to the invention, the position of arc 1 of the generating screw profile is such that arc 1 is located within or on the boundary of an annulus having the dimensionless outer radius RA and the dimensionless inner radius RI, whose centre point is located on the point of rotation of the generating screw profile. The position is preferably predefined by the positions of the starting point and the centre point of arc 1. In the present example the starting point of arc 1 is placed at coordinate x=RA=0.6203, y=0.0000 and the centre point of arc 1 at coordinate Mx_1=0.0000, My_1=0.0000. Thus, arc 1 is located on the outer screw radius RA and the configuration rule that at least one arc touches the outer screw radius RA is fulfilled.

According to the invention, the angles $\alpha\_2, \ldots, \alpha\_(n-1)$ of n−2 additional arcs, i.e. 14 additional arcs of the generating screw profile are selected to be, in terms of radian measurement, greater than or equal to 0 and smaller than or equal to $2\pi$. In the present example, the angles of these 14 additional arcs are selected to be: $\alpha\_2$=0.6330, $\alpha\_3$=0.6330, $\alpha\_4$=0.2208, $\alpha\_5$=0.1864, $\alpha\_6$=0.4003, $\alpha\_7$=0.4003, $\alpha\_8$=0.3934, $\alpha\_9$=0.2744, $\alpha\_{10}$=0.6330, $\alpha\_{11}$=0.6330, $\alpha\_{12}$=0.2208, $\alpha\_{13}$=0.1864, $\alpha\_{14}$=0.4143 and $\alpha\_{15}$=0.4143. According to the invention, the dimensionless radii $R\_2, \ldots, R\_(n-1)$ of these 14 additional arcs of the generating screw profile are selected to be greater than or equal to 0 and smaller than or equal to the dimensionless centre distance A. In the present example the dimensionless radii of these additional 14 arcs are selected to be: R_2=0.0000, R_3=1.0000, R_4=0.3797, R_5=0.7485, R_6=0.4726, R_7=0.4726, R_8=0.1977, R_9=0.4827, R_10=0.6000, R_11=0.4000, R_12=0.5173, R_13=0.1485, R_14=0.8887 and R_15=0.8887. According to the configuration rules the arcs are arranged in such a manner that they merge tangentially into each other in such a manner that a closed, convex screw profile is obtained, wherein an arc whose dimensionless radius is 0 is treated in the same way as an arc whose dimensionless radius is eps, which is a very small positive real number which tends towards 0 (eps<<1, eps→0). Based on this configuration rule, the end point of an arc is at the same time the starting point of the next arc. The required tangential transition between a first arc and a second subsequent arc is such that the centre point of this second subsequent arc is positioned in such a manner on the straight line through the end point and the centre point of the first arc that the distance between the centre point of the second subsequent arc and the end point of the first arc is equal to the radius of the second subsequent arc and the screw profile is convex. An arc with a radius of 0 is treated in the same way as an arc with a very small radius eps, which tends towards 0, so that the tangential transition can continue to be constructed. Alternatively an arc with a radius of 0 can be treated in such a manner that the screw profile has a kink at the position of this arc, the size of the kink being determined by the angle of this arc. In the present example, the abovementioned configuration rule results in the following positions of the centre points of the 14 additional arcs: Mx_2=0.5971, My_2=0.1681, Mx_3=−0.0187, My_3=−0.6198, Mx_4=0.0001, My_4=0.0002, Mx_5=0.0699, My_5=−0.3619, Mx_6=−0.0316, My_6=−0.1054, Mx_7=−0.0316, My_7=−0.1054, Mx_8=−0.2855, My_8=0.0000, Mx_9=−0.0005, My_9=0.0000, Mx_10=0.1124, My_10=0.0318, Mx_11=−0.0107, My_11=−0.1258, Mx_12=−0.0072, My_12=−0.0086, Mx_13=0.0626, My_13=−0.3707, Mx_14=−0.2097, My_14=0.3176 and Mx_15=−0.2097, My_15=0.3176. The end point of arc 4 and the starting point of arc 5 are located on the dimensionless inner radius RI of the generating screw profile, thus fulfilling the configuration rule that at least one arc touches the dimensionless inner radius RI.

According to the invention, angle $\alpha\_16$ of the last arc of the generating screw profile is such that the sum of the angles of the 16 arcs of the generating screw profile is, in terms of radian measurement, $2\pi$, wherein angle $\alpha\_16$ is, in terms of radian measurement, greater than or equal to 0 and smaller than or equal to $2\pi$. In the present example, the angle of the last arc $\alpha\_16$ is 0.3654. According to the invention, the dimensionless radius R_16 of the last arc of the generating screw profile is such that this last arc completes the generating screw profile. Since the end point of arc 15 is at the same time the starting point of the first arc, the radius of arc 16, R_16, is 0.0000. The centre point of arc 16 is thus located at coordinate Mx_16=0.6203, My_16=0.0000.

The configuration rule that all arcs of the generating screw profile are located within or on the boundary of an annulus with the dimensionless outer radius RA and the dimensionless inner radius RI with a centre point at the point of rotation of the generating screw profile is also fulfilled by the angles and radii selected for the 16 arcs in the present example and their positions.

The generated screw profile is based on the generating screw profile. According to the invention, the number of arcs n' of the generated screw profile is the same as the number of arcs n of the generating screw profile. In the present example, the number of arcs of the generated screw profile n' is 16. According to the invention, the dimensionless outer screw radius RA' of the generated screw profile is equal to the dimensionless centre distance A minus the dimensionless inner radius RI of the generating screw profile. In the present example the dimensionless outer screw radius of the generated screw profile RA' is A−R/=0.6202. According to the invention, the dimensionless inner radius RI' of the generated screw profile is equal to the dimensionless centre distance A minus the dimensionless outer screw radius RA of the generating screw profile. In the present example, the dimensionless inner radius RI' of the generated screw profile is A−RA=0.3797.

According to the invention, the angle $\alpha\_i'$ of the i'nth arc of the generated screw profile is the same as the angle $\alpha\_i$ of the inth arc of the generating screw profile, wherein i and i' are integers which together represent all values in the range from 1 to the number of arcs n and n' respectively. In the present example, the angles of the 16 arcs of the generated screw profile are: $\alpha\_1'=\alpha\_1=0.2744$, $\alpha\_2'=\alpha\_2=0.6330$, $\alpha\_3'=\alpha\_3=0.6330$, $\alpha\_4'=\alpha\_4=0.2208$, $\alpha\_5'=\alpha\_5=0.1864$, $\alpha\_6'=\alpha\_6=0.4003$, $\alpha\_7'=\alpha\_7=0.4003$, $\alpha\_8'=\alpha\_8=0.3934$, $\alpha\_9'=\alpha\_9=0.2744$, $\alpha\_10'=\alpha\_10=0.6330$, $\alpha\_11'=\alpha\_11=0.6330$, $\alpha\_12'=\alpha\_12=0.2208$, $\alpha\_13'=\alpha\_13=0.1864$, $\alpha\_14'=\alpha\_14=0.4143$, $\alpha\_15'=\alpha\_15=0.4143$ and $\alpha\_16'=\alpha\_16=0.3654$.

According to the invention, the sum of the dimensionless radius R_i' of the i'nth arc of the generated screw profile and the dimensionless radius R_i of the inth arc of the generating screw profile is equal to the dimensionless centre distance A, wherein i and i' are integers which together represent all values in the range from 1 to the number of arcs n and n' respectively (R_1'+R_1=A=1, ..., R_n'+R_n=a=1). In the present example the radii of the 16 arcs of the generated screw profile are: R_1'=A−R_1=1−0.6203=0.3797, R_2'=A−R_2=1−0.0000=1.0000, R_3'=A−R_3=1−1.0000=0.0000, R_4'=A−R_4=1−0.3797=0.6203, R_5'=A−R_5=1−0.7485=0.2515, R_6'=A−R_6=1−0.4726=0.5274, R_7'=A−R_7=1−0.4726=0.5274, R_8'=A−R_8=1−0.1977=0.8023, R_9'=A−R_9=1−0.4827=0.5173, R_10'=A−R_10=1−0.6000=0.4000, R_11'=A−R_11=1−0.4000=0.6000, R_12'=A−R_12=1−0.5173=0.4827, R_13'=A−R_13=1−0.1485=0.8515, R_14'=A−R_14=1−0.8887=0.1113 R_15'=A−R_15=1−0.8887=0.1113 and R_16'=A−R_16=1−0.0000=1.0000.

According to the invention, the distance between the centre point of the i'nth arc of the generated screw profile and the centre point of the inth arc of the generating screw profile is equal to the dimensionless centre distance A and, according to the invention, the distance between the centre point of the i'nth arc of the generated screw profile and the point of rotation of the generated screw profile is equal to the distance between the centre point of the inth arc of the generating screw profile and the point of rotation of the generating screw profile and, according to the invention, the connecting line between the centre point of the i'nth arc of the generated screw profile and the centre point of the inth arc of the generating screw profile is a line parallel to a connecting line between the point of rotation of the generated screw profile and the point of rotation of the generating screw profile, wherein i and i' are integers which together represent all values in the range from 1 to the number of arcs n and n' respectively (i'=i). By positioning the point of rotation of the generating screw profile at point x=0, y=0 and the point of rotation of the generated screw profile at point x=A=1, y=0, the x coordinate of a centre of the circle Mx_i' of the generated screw profile can be calculated by adding the dimensionless centre distance A to the x coordinate of the centre of the circle Mx_i of the generating screw profile, and the y coordinate of the centre of the circle My_i' of the generated screw profile is the same as the y coordinate of the centre of the circle My_i of the generating screw profile. In the present example the positions of the centre points of the 16 arcs of the generated screw profile are: Mx_1'=1.0000, My_1'=0.0000, Mx_2'=1.5971, My_2'=0.1681, Mx_3'=0.9813, My_3'=−0.6198, Mx_4'=1.0001, My_4'=0.0002, Mx_5'=1.0699, My_5'=−0.3619, Mx_6'=0.9684, My_6'=−0.1054, Mx_7'=0.9684, My_7'=−0.1054, Mx_8'=0.7145, My_8'=0.0000, Mx_9'=0.9995, My_9'=0.0000, Mx_10'=1.1124, My_10'=0.0318, Mx_11'=0.9893, My_11'=−0.1258, Mx_12'=0.9928, My_12'=−0.0086, Mx_13'=1.0626, My_13'=−0.3707, Mx_14'=0.7903, My_14'=0.3176, Mx_15'0.7903, My_15'=0.3176 and Mx_16'=1.6203, My_16'=0.0000.

According to the invention, a starting point of the i'nth arc of the generated screw profile is located in an opposite direction, in relation to the centre point of the i'nth arc of the generated screw profile, to that of a starting point of the inth arc of the generating screw profile in relation to the centre point of the inth arc of the generating screw profile, wherein i and i' are integers which together represent all values in the range from 1 to the number of arcs n and n' respectively (i'=i). In the present example the starting point of arc 1 of the generated screw profile is therefore, for example, located at coordinate x=0.6203, y=0.

In the present example, the method according to the invention for generating planar, tightly intermeshing, self-cleaning, co-rotating screw profiles produces a generated screw profile in which all 16 arcs of the generated screw profile merge tangentially into each other and form a closed, convex screw profile. Also, all 16 arcs of the generated screw profile are located within or on the boundary of an annulus with the dimensionless outer radius RA' and the dimensionless inner radius RI', whose centre point is located on the point of rotation of the generated screw profile. In addition, arc 1 of the generated screw profile is located on the dimensionless inner radius RI' and the configuration rule that at least one arc touches the dimensionless inner radius RR' is thereby fulfilled. In addition, the end point of arc 4, which is also the starting point of arc 5, of the generated screw profile, is located on the dimensionless outer screw radius RA' of the generated screw profile and the configuration rule that at least one arc touches the dimensionless outer screw radius RA' is thereby fulfilled.

Figure 26:
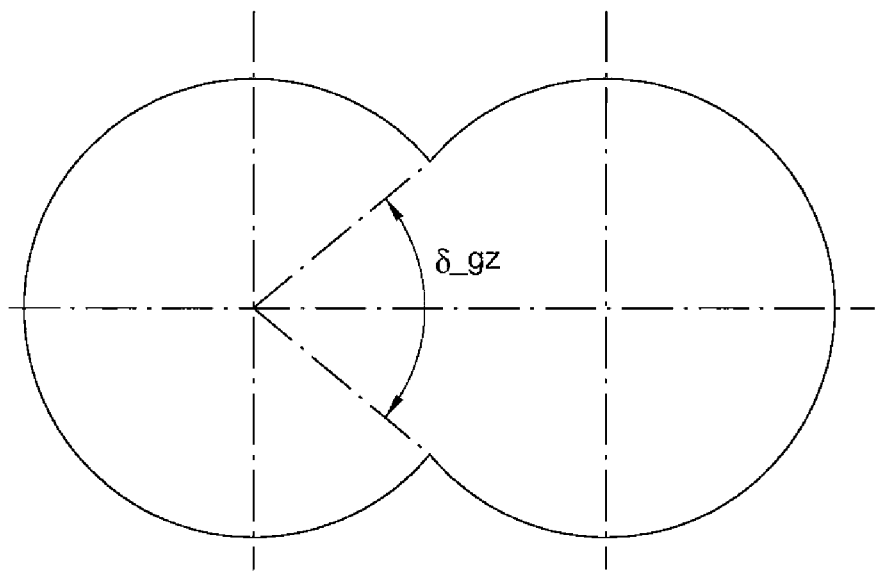

FIG. 26 depicts a figure-of-8-shaped screw barrel with two bores. The region in which two barrel bores penetrate each other is referred to as the intermeshing zone. The two points of intersection of two barrel bores are referred to as the barrel intersection points. In addition, the opening angle δ_gz between the two barrel intersection points is depicted.

Figure 27:
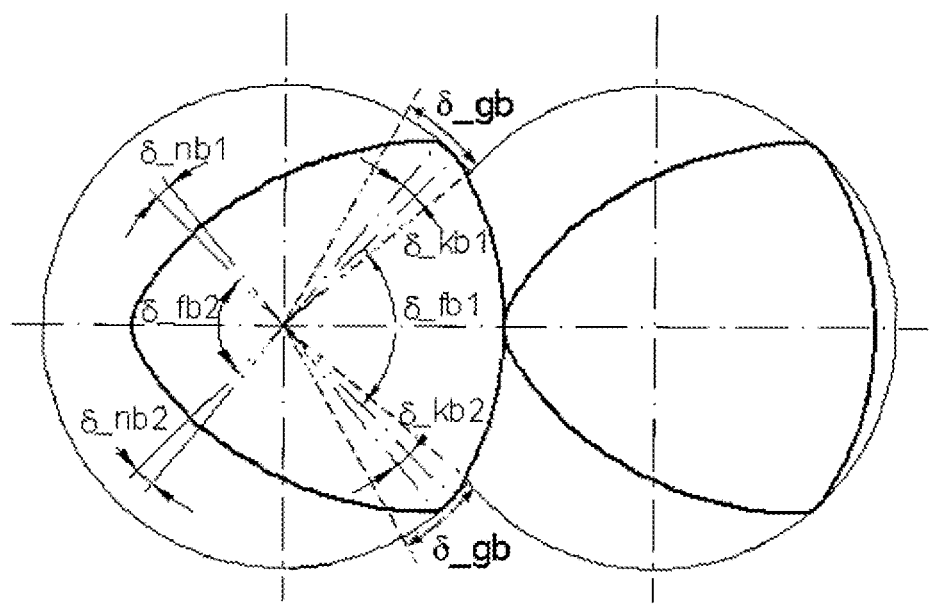

FIG. 27 shows angles δ_fb1, δ_fb2, δ_nb1, δ_nb2, δ_kb1, δ_kb2 and δ_gb in relation to a screw profile according to the invention.

In the figures, a maximum of 16 arcs are used to describe a generating or a generated screw profile. However, the methods according to the invention are in no way restricted to a maximum of 16 arcs. Rather, as many arcs as desired can be used to generate screw profiles. As a result, it is possible, in particular, to approximate screw profiles which are not constructed from arcs and are therefore not self-cleaning by way of a sufficiently high number of arcs with the desired accuracy.

The longitudinal sectional profile can be calculated from a (generating or generated) screw profile. Every arc of a screw profile is preferably used, in order to calculate a part of the longitudinal section which belongs to this arc by means of an explicit function.

In order to calculate the spacing s of a point of an arc of a screw profile from the rotational axis, the point of intersection (Sx, Sy) of a straight line g is characterized in a first step in that the said straight line lies in the plane of the screw profile, runs through the pivot point of the screw profile and the orientation of the straight line is given by the angle φ, defined with an arc kb, characterized by its radius r and the position of its centre point (Mx, My). In a second step, the spacing s of the point of intersection (Sx, Sy) from the pivot point of the screw profile is calculated. The calculation of a point of intersection of a straight line with an arc can be represented by an explicit function. The same applies to the spacing calculation. For the spacing, it therefore holds that s=s(φ, r, Mx, My). In the case of a known lead t of a screw element, the angle φ can be converted via φ/2π*t into an axial position z_ax, with the result that it holds for the spacing that s=s(z_ax, r, Mx, My)=s(φ/2π*t, r, Mx, My). The function s(z_ax, r, Mx, My) describes the sought longitudinal section for an arc of the screw profile.

The invention claimed is:

1. Screw elements for multiscrew extruders with pairs of co-rotating screws, wherein the screws are fully wiping in pairs, and wherein each screw has one of:
a generating screw profile and a generated screw profile consisting of arcs with non-infinite radiuses, each of the generating and generated screw profiles being axisymmetric referring to one axis which passes through the point of rotation of the respective screw profile,
wherein each of the generating screw profile and the generated screw profile comprises one sealing region, one or more transition regions, one channel region, one or more tip regions, one or more flank regions, and one or more grooved regions, and each screw profile consists of a sequence of the one sealing region, one of the transition regions, the one channel region, another of the transition regions, and further wherein
the sealing region consists of a sequence of tip region, flank region, tip region,
the channel region consists of a sequence of root region, flank region, root region, and
each transition region is one of the flank regions.

2. The screw elements according to claim 1, wherein the sealing region is characterized in that
the flank region has an angle δ_fb1 starting from the point of rotation of the screw profile which is greater than or equal to half the opening angle δ_gz between the two barrel intersection points (δ_fb1≥arccos(0.5*a/ra)),
one tip region has an angle δ_kb1 starting from the point of rotation of the screw profile which is smaller than or equal to the difference between the tip angle of a one-flight Erdmenger screw profile and the opening angle δ_gz between the two barrel intersection points (δ_kb1≤π−4*arccos(0.5*a/ra)),
the other tip region has an angle δ_kb2 starting from the point of rotation of the screw profile which is smaller than or equal to the difference between the tip angle of a one-flight Erdmenger screw profile and the opening angle δ_gz between the two barrel intersection points (δ_kb2≤π−4*arccos(0.5*a/ra)),
and further wherein the channel region is characterized in that
the flank region has an angle δ_fb2 starting from the point of rotation of the screw profile which is greater than or equal to half the opening angle δ_gz between the two barrel intersection points (δ_fb2≥arccos(0.5*a/ra)) and the minimum distance between the flank region and the screw radius ra is larger than half the flight depth h,
one root region has an angle δ_nb1 starting from the point of rotation of the screw profile which is smaller than or equal to the difference between the tip angle of a one-flight Erdmenger screw profile and the opening angle δ_gz between the two barrel intersection points (δ_nb1<π−4*arccos(0.5*a/ra)),
the other root region has an angle δ_nb2 starting from the point of rotation of the screw profile which is smaller than or equal to the difference between the tip angle of a one-flight Erdmenger screw profile and the opening angle δ_gz between the two barrel intersection points (δ_nb2≤π−4*arccos(0.5*a/ra)).

3. The screw elements according to claim 2, wherein the two barrel intersection points are surrounded by barrel regions wherein each barrel region comprises, in each barrel bore and based on each of the two barrel intersection points, an angle of δ_gb in relation to the centre point of the barrel bores, and further wherein the sum of the angles of the tip and flank regions δ_kb1, δ_kb2 and δ_fb1 of the sealing region is in the range from 0.75*δ_gz to 2*δ_gb+δ_gz and the sum of the angles of the root and flank regions δ_nb1, δ_nb2 and δ_b2 of the channel region is in the range from 0.75*δ_gz to 2*δ_gb+δ_gz.

4. The screw elements according to claim 1, wherein the transition region consists of a flank region.

5. The screw elements according to claim 1, comprising screw profiles which produce a linear seal to the intermeshing zone.

6. The screw elements according to claim 1, comprising screw profiles which produce a punctiform seal to the intermeshing zone.

7. The screw elements according to claim 1, wherein a maximum distance between the tip regions of the sealing region of the screw profiles and the barrel is in the range of 0 to 0.05 times the centre distance.

8. The screw elements according to claim 1, wherein the flight number z is 1.

9. The screw elements according to claim 8, comprising 8-arc screw profiles.

10. The screw elements according to claim 1, wherein the flight number z is 2.

11. The screw elements according to claim 1, wherein the screw elements are designed as conveying elements or mixing elements.

12. The screw elements according to claim 1, wherein the screw elements are designed as kneading elements.

13. The screw elements according to claim 1, wherein the screw elements are designed as transition elements.

14. The Screw elements according to claim 2, wherein the sum of the angles of the tip and flank regions $\delta\_kb1$, $\delta\_kb2$ and $\delta\_fb1$ of the sealing region is in the range from $\delta\_gz$ to $\delta\_gb+\delta\_gz$ and the sum of the angles of the root and flank regions $\delta\_nb1$, $\delta\_nb2$ and $\delta\_b2$ of the channel region is in the range from $\delta\_gz$ to $\delta\_gb+\delta\_gz$.

15. The screw elements according to one of claim 2, wherein the maximum distance between the tip regions of the sealing region of the screw profiles and the barrel is in the range of 0 to 0.025 times the centre distance.

16. The screw elements according to claim 1, wherein the generating screw profile consists of n arcs and the generated screw profile consists of n' arcs, wherein all of the arcs of the generating screw profile merge into each other tangentially such that a closed, convex screw profile is obtained, and wherein the number of arcs n of the generating screw profile is selected such that n is an integer greater than or equal to 1.

17. The screw elements according to claim 1, wherein the generating and the generated screw element are single-flighted screw elements.

18. The screw elements according to claim 1, wherein the profile of the generating and the generated screw element are each created of 16 arcs, wherein adjacent arcs in each half of the profile generated by the axis of symmetry have different radii and/or different centers.

19. The screw elements according to claim 1, wherein the generating and the generated screw elements each have two tip regions.

20. The screw elements according to claim 1, wherein the generating and the generated screw elements each have two root regions.

21. The screw elements according to claim 1, wherein the profile both of the generating and the generated screw elements each comprises exactly one sealing region, exactly two transition regions, and exactly one channel region, and the sealing region is followed directly by the transition region, which is followed directly by the channel region, which is followed directly by the transition region.

* * * * *